Patented Nov. 6, 1951

2,573,738

UNITED STATES PATENT OFFICE 2,573,738

FUNGICIDAL COMPOSITIONS

Carleton N. Smith, Snyder, Fred R. Whaley, Kenmore, and Richard H. Wellman, Yonkers, N. Y., assignors, by mesne assignments, to Union Carbide and Carbon Corporation, a corporation of New York No Drawing. Application December 7, 1945, Serial No. 633,530

26 Claims. (Cl. 167—14)

This invention relates to toxic materials, particularly to fungicidal materials and to fungicidal compositions and to methods of combatting fungi; and more specifically to such practical, effective and low cost materials, compositions and methods as may be used effectively on desirable plant life to prevent the growth of the parasitic fungi and yet not have a deleterious effect on the host plant in foliage.

A foliage fungicide must, primarily, prevent infection of the host by the fungus for which it is being used. It must also be selective and have a margin of safety in that, as used, it must not burn or injure the foliage of the host plant severely at concentrations necessary to control the fungus. The foliage fungicide should also resist weathering which includes wash-off caused by rain, decomposition by ultra-violet light, oxidation and hydrolysis in the presence of moisture or, at least, such weathering as materially decreases the desirable characteristics of the material, for instance the fungicidal action, or imparts undesirable characteristics, for instance phytotoxicity, to the material. The fungicide should also be compatible with other constituents of the spray schedule, in particular insecticides. The control of fungi attacking other plants is a problem because the host and the parasitic fungus are both plants and it is difficult to inhibit the parasite and yet not injure the living host.

We have found that certain basic chromates are fungicides of such high fungicidal activity and such low phytotoxic effect on a living plant as to be useful in fungicidal sprays. Not all chromates possess this combination of properties.

Chromates used in accordance with this invention are all basic, in the sense that the total equivalents of cation are greater than the total equivalents of anion exclusive of oxide and hydroxide. The term "basic" as here used does not infer that the hydrogen ion concentration (the pH value) of the spray composition, or of the solution from which the chromate solubility is determined or of the liquid in which the toxic chromates are prepared, is above the neutral pH of 7. Chromates which are basic with respect to valence may give water suspensions (slurries or spray compositions) or solutions or may be formed in liquors, with pH values under 7.

It has heretofore been proposed to use chromates to inhibit fungi but so far as we are aware no chromates have ever been used successfully for fungi-inhibiting "foliage treatment," by which is meant the treatment of foliage with a chromate which will remain on the foliage for a reasonable length of time and inhibit the fungi during this period and not injure the foliage too severely. It has been proposed to apply compositions comprising chromates to weeds to kill the plants. It has also been proposed to use chromates to inhibit bacteria and the like in toilets, and chromates have been proposed for wood preservation. Alkaline earth chromates have been proposed for use on plants as insecticides but of the alkaline earth chromates barium chromate is ineffective as a fungicide and calcium and strontium chromates are too phytotoxic if used in sufficient quantity to remain on the plant through any appreciable amount of rainfall; and if used in such small amounts as not to injure the plant, they do not retain their effectiveness on being subjected to weathering.

The basic chromates which we have found to be practical and effective for foliage treatment are certain basic chromates containing multivalent metals in the positive radical of the chromate. By the term "multivalent metals" we mean metals which are combined in the chromates with a valence of at least 2. From a cost point of view, chromates of metals such as gold, platinum and the rare metals are out of the question. The practical metals, in point of low cost for volume use, are iron, copper, zinc, aluminum and chromium. Nickel, cobalt, cadmium, cerium, uranium and mercury are generally too expensive for volume use unless special properties are desired or the fungicides are to be used noncommercially, for instance by householders on ornamental plants or in private gardens where cost is of little moment. The more expensive metals may, however, be used in connection with the cheaper metals as will hereafter be explained.

The term "multivalent metals" excludes the univalent metals such as sodium, potassium and other alkali metals; simple chromates of these metals are too phytotoxic as are also the simple chromates of thallium and silver. Mercurous chromate is too insoluble to be fungicidal, and we have been unable to prepare a simple chromate of univalent copper. The univalent metals may appear in the chromates, however, along with the multivalent metals, the distinction being that where the metal of the chromate is only a univalent metal the chromate is too phytotoxic for use as a foliage fungicide or is not fungicidal, whereas where the metal of the basic chromate is only a multivalent metal the chromate is satisfactory as a fungicide (provided it has certain solubility characteristics hereinafter explained) being fungicidal and not too phytotoxic; but a univalent metal may be used with a multivalent metal and yet provide a satisfactory chromate fungicide. Thus it is not essential that the chromate contain a univalent metal but it is essential that the chromate contain a multivalent metal and while the basic chromate may contain only a multivalent metal it may not contain only a univalent metal. The utility of the univalent metal is in allowing an adjustment within a given chromate type of (1) "chromate solubility," or (2) multivalent metal to hexavalent chromium ratio, or (3) fungicidal properties.

The criteria by which to determine which multivalent metals and the amount thereof to be used in the chromate are that the chromate solubility should be within the range hereinafter given, the amount must be regulated in the case of metals which exhibit specific toxicity toward a given plant so that the over-all phytotoxicity is not too great and, as practical matters, cheaper metals should be used in place of more expensive metals and no more metal should be used than is necessary to obtain the desired toxic action. Unless the metal has some specific advantage, for instance, as will later be shown, it controls insects or tip burn or safens with respect to over-all phytotoxicity, the object is to use as little multivalent metal as is possible per unit of hexavalent chromium, while retaining a usable solubility, in order to get a maximum amount of hexavalent chromium on the foliage for a given dosage or the minimum total dosage for a given amount of hexavalent chromium.

Not all chromates of all of the previously-mentioned multivalent metals may successfully be used, as each metal affects the action of the chromate, either in the matter of fungicidal action or phytocidal action or both. All chromates (including those contemplated herein, as well as those not contemplated) are soluble in, or are hydrolyed and the hydrolysis product is soluble in, water to some extent and when such a solution is analyzed a greater or less amount of hexavalent chromium will be found in the solution. It should be explained that for all of the multivalent metals contemplated herein, chromates with varying proportions of multivalent metal may be formed, for instance there is the chromate $Cu_3CrO_6.6H_2O$ and the chromate $Cu_7Cr_2O_{13}.6H_2O$. The majority of the chromates contemplated herein are of this non-Daltonian type, a characteristic of which is that their composition can vary in a continuous manner with their properties varying either imperceptibly or in a continuous manner. In the case of the chromate of any given metal or combination of metals, the toxic action of the chromate is attributable in part to the negative chromate radical containing hexavalent chromium and in part to the positive radical comprising the multivalent metal if the multivalent metal itself is toxic or has a synergistic effect, but it has been found with respect to the action of the toxic chromate radical that, if the amount of hexavalent chromium in solution is too great, the chromate is too phytotoxic while if the amount of hexavalent chromium in solution is too low the chromate is not fungicidal. We have found that by using the chromates contempated herein, we can produce compositions for foliage treatment to control fungous diseases of plants utilizing the hexavalent chromium to its fullest extent in inhibiting the fungi with the least phytotoxic effect.

In this specification, reference is frequently made to the "chromate solubility" of the chromates. This is determined by shaking 1 gram of the particular metal chromate under observation with 100 cc. of distilled water until a saturated or substantially saturated solution is obtained, then filtering and then analyzing the clear filtrate for the chromate radical, that is for hexavalent chromium. The "chromate solubility" is the amount of hexavalent chromium in the filtrate expressed as grams of hexavalent chromium per 100 cc. of solution (g. $Cr^{+6}$/100 cc.). The solution is made at a temperature of 25° C. With chromates near the upper limit of chromate solubility contemplated herein, the chromate solubility is reduced less than 7% in lowering the temperature from 25° C. to 11° C. and is increased less than 15% in raising the temperature from 25° C. to 50° C. With chromates near the lower limit of chromate solubility contemplated herein, the changes of chromate solubility with temperatures between 11° C. and 50° C. are negligible. The temperatures of 11° C. and 50° C. are about the lowest and the highest temperatures to which foliage is exposed during the application of fungicides. The solution from which the chromate solubility is determined becomes saturated, in general, by shaking the chromate and the water for a maximum of about 15 hours, conveniently overnight. Substantial saturation is obtained in the course of an hour or less, usually within a few minutes after mixing the chromate and the water and shaking. The shaking should be vigorous enough to avoid the formation of such aggregates of solid as fail to disintegrate again during further shaking. The chromate solubility is determined at the 1:100 ratio of chromate to water as this is approximately the maximum concentration of chromate in a water slurry which we contemplate applying to foliage.

As will be shown later in this specification by specific examples used for comparative purposes, metal chromates which have too high a chromate solubility are too phytotoxic to be of practical use as foliage fungicides. Certain chromates, for instance potassium chromate, calcium chromate, or copper dichromate, are too phytotoxic. A slurry of such a chromate, in effective dosage, cannot be applied to foliage without injuring the foliage. Of course a solution may be prepared containing only such a limited amount of, for instance, potassium chromate that the solution is not phytotoxic and this may be sprayed on the plants; but this is not practical because, in the event of rain and even in a heavy dew, the potassium chromate dissolves in the water, washes off of the plant and the fungicide is gone. Lead chromate is too insoluble to be a practical foliage fungicide per se. The amount of chromate in the slurry is not a sufficient criterion for judging the effectiveness of the chromate as the liquid part of the slurry is saturated with the chromate or a hydrolysis product thereof and the concentration of the solution (that is, the amount of chromate in the liquid part of the slurry) depends principally, at any given time, upon the solubility of the particular chromate and only to a slight extent on the amount of chromate in the slurry. Mere mixtures of a highly soluble chromate, such as potassium chromate, and a substantially insoluble chromate, such as lead chromate, cannot effectively be used even though, when the mixture is subjected to the above solubility test, the initial solubility may meet the chromate solubility requirement because the two chromates act as separate compounds, the potassium chromate being phytotoxic and washing away on the first rain and the remaining lead chromate exhibiting no fungicidal action. However, complex chromates containing lead together with a multivalent metal may have chromate solubilities in the range useful for fungicidal action. For practical use on foliage, the chromate must have a chromate solubility within the limits given herein and, for use on hosts exposed to the weather, a slurry or a dust is applied. The chromates of the chromate solubility disclosed herein exhibit a correlation of four factors which enable the chromates to be useful and practical as foliage fungicides, namely sufficiently high fungicidal action, sufficiently low phytotoxic action, sufficiently low over-all solubility to retain their effectiveness on the plant during normal weathering conditions between sprays but, with respect to that part of the chromate which does dissolve, a sufficiently high rate of solution quickly to form a fungicidal solution which spreads over the plant and inhibits the germination of the fungous spores. The solid chromate, that is the chromate of the slurry or of the dust which is undissolved in the water of the slurry or undissolved in the water of rain, dew or plant guttation, provides a reserve of chromate in situ on the plant, readily at hand quickly to form a sufficiently concentrated solution of the chromate to be fungicidal with the water remaining on the plant after a rain or with water from dew or plant guttation. This solution will be of the correct concentration to deposit on the plant, as the moisture evaporates, a film of chromate which is fungicidal yet not too phytotoxic, the solution (or hydrolysis and solution) of the chromates being reversible. Also, as the chromates are so relatively insoluble, the usual shower does not dissolve and carry away any great amount of the chromate. For the majority of the chromates contemplated herein, the chromate is slightly decomposed or hydrolyzed to a degree dependent upon the amount of water present but this hydrolysis is reversible. It should be understood that a fungous spore does not germinate except in the presence of water and that such germination is a necessary preliminary to the infection of the plant. The opportunity for a spore to germinate occurs when a water-base spray is applied to the plant and after each rain and when dew forms and possibly in the water of guttation but these are also the conditions under which the inhibitive solutions of the chromates form. Thus the chromates contemplated herein provide a relatively long-lasting pest control which does not injure the plant when freshly applied nor, due to the stability of the chromates, thereafter.

The chromate solubility of the chromate should be within the limits of from about 0.0001 to 0.03 gram of hexavalent chromium per 100 cc. of solution. With substances of the type contemplated herein which have chromate solubilities below the lower of these values, the concentration of dissolved chromate is too low to contribute anything discernable toward fungicidal action and chromates which have chromate solubilities above the higher of these values inhibit fungi satisfactorily but have too high a chromate phytotoxicity to be applied to plants in foliage. For instance, barium chromate (BaCrO$_4$) showing a chromate solubility of only 0.00007 and lead chromate (PbCrO$_4$) showing a chromate solubility of only 0.0000009 were found to be non-fungicidal. Where the chromate solubility is below .006 there is no chromate phytotoxicity or only a trace, and where the chromate solubility lies between .006 and .030 there may be some chromate phytotoxicity but it is not serious. Where the chromate solubility is above .030, chromate phytotoxicity may be serious in the absence of a safening agent. Thus the substances which are useful and are contemplated herein are basic chromates of multivalent metals whose chromate solubilities lie in a definite range. These chromates are effective plant fungicides and have such low chromate phytotoxic characteristics that they are not significantly injurious to plant foliage either during application to the plant by means of suitable compositions, or immediately after application or throughout the period of contact with the plant unless the specific multivalent metal in the compound is itself phytotoxic to specific plants as copper is specifically phytotoxic to apple, but the specific phytotoxicity can easily be avoided by using another multivalent metal, for instance zinc, for all or a part of the copper. Fungicidal action is influenced to a great extent by the multivalent metal of the chromate, the preferred metals for this purpose being copper, cadmium, cerium, iron, zinc, aluminum and mercuric mercury including these multivalent metals in complex chromates.

From a consideration of chromate No. 27 (Table A), it will be seen that where the chromate solubility is low the phytotoxicity is so low (rating 0–1) that the chromate may safely be used without injuring the plant too severely; and from a consideration of chromate No. 117, it will be seen that where the chromate solubility is high, the plant is injured (rating 3); and from a consideration of chromate No. 156, it will be seen that where the chromate solubility is too low the fungicidal properties of the chromates are so low that the chromate is of no practical value.

The lower chromate solubility limit of 0.0001 (below which the chromate radical contributes practically nothing to the fungicidal action) is established through a comparison of chromates Nos. 123, 156, and 157 with chromates Nos. 3, 4, 37, 74, 81, 86, 108, 111, and 115. The first three chromates have practically no fungicidal action and the latter chromates have good fungicidal action, as is indicated by the slide germination tests and greenhouse tests (Table A).

Thus basic chromates are, for practical consideration and use, sufficiently fungicidal without being too phytotoxic if they have a chromate solubility between .0001 and .030 g. $Cr^{+6}/100$ cc.

From the data disclosed herein, it will be seen that injury due to the chromate radical is essentially nil if the chromate shows a chromate solubility under .006 and is only slight or moderate if the chromate shows a chromate solubility between .006 and .03. Only when the solubility is .03 or above does the injury become serious or is it likely to be serious. Any exceptions to this may be due to the presence of phytotoxic quantities of another toxic element; and thus it is appreciated that chromates having chromate solubilities within the given range may be phytotoxic to specific plants due to the presence of a specific metal, for instance as copper is phytotoxic to apple. This type of phytotoxicity is recognized as it runs through all spray materials containing the metal, for instance the phytotoxicity of copper to apple runs through Bordeaux mixture and commercial fixed coppers as well as through the chromates. However, while the chromate radical will not, in the case of a chromate of a highly phytotoxic metal like copper, overcome the phytotoxic effect of the copper on apple foliage, the situation is that where the chromate solubility is within the limits disclosed herein, the chromate phytotoxicity is within safe limits and the chromate radical exerts its maximum fungicidal effect consistent with phytotoxic safety and allows the use of a minimum amount of multivalent metal, for instance copper, which may be phytotoxic, thus in effect reducing the over-all phytotoxicity for a given fungicidal effectiveness. On the other hand, where the multivalent metal is not phytotoxic to a plant, for instance as zinc is not phytotoxic to apple, the optimum dosage from the standpoint of effectiveness and cost may be used.

A distinction is made between over-all fungicidal action, multivalent metal (or metal) fungicidal action, and hexavalent-chromium (or chromate) fungicidal action; likewise a distinction is made between over-all phytotoxicity, multivalent metal (or metal) phytotoxicity, and hexavalent-chromium (or chromate) phytotoxicity. Over-all fungicidal action has, as components, the metal fungicidal action and the chromate fungicidal action. Over-all phytotoxicity has as components metal phytotoxicity and chromate phytotoxicity. Where the chromate solubility is within the limits set herein, the chromate is fungicidal and the chromate phytotoxicity is negligible or non-existent. None of the species of plants (potato, apple, cherry, tomato, bean, tobacco, buckwheat, bayberry, cabbage, or cucumber) which have been sprayed with chromates show a specific sensitivity to chromate as, for instance, some plants show to copper. Where the over-all phytotoxicity of the metal chromate is too great on any particular species of plant, the phytotoxicity is due to the sensitivity of the particular species to the particular metal of the metal chromate and a remedy is to reduce, in the metal chromate, the amount of metal to which the plant is sensitive or to include in the metal chromate complex a safening metal as a part of the metal chromate as, for example, lime in safening copper injury. The amount of metal to which the plant is sensitive may be reduced by replacing it partially or wholly by a metal to which the plant is not sensitive or by controlling the conditions under which the metal chromate is prepared so that the chromate contains less of the metal in proportion to the hexavalent chromium. The phytotoxic effect due to chromates with solubilities above the upper limit, for instance alkali chromates, should not be confused with the specific phytotoxicity of a particular metal for a particular species of plant; but even in the case of specific phytotoxicity, the amount of damage which the multivalent metal can do, is reduced because, due to the chromate fungicidal action and minimum chromate phytotoxic action, less of the metal chromate is required for control of the fungus and hence there is less phytotoxic metal on the plant.

The significance of the chromate solubility limits is illustrated in the following table by random examples. To illustrate this point further, the pertinent data from Table A have been tabulated in the accompanying Table 1. Only the average phytotoxic rating on buckwheat, bushbean, and tobacco (hereafter sometimes designated as B. B. T.) has been used, because it represents the average of several individual tests on several representative plants. The tomato phytotoxicity tests and other phytotoxicity tests described herein serve to confirm the relationship established by the B. B. T. tests. The tests are described later in this specification under the heading "Tests."

Table 1 is divided into four principal groups of columns. The first group of four columns lists chromates whose chromate solubility is above .03, and whose B. B. T. rating is above 2. These chromates are not contemplated for foliage treatment, because they injure the foliage. The second and third groups of four columns each, list representative chromates whose chromate solubility falls within the critical limits herein disclosed. The chromates listed in the second and third groups are representative of those contemplated in this invention. The chromates contemplated are divided into the second and third groups, on the basis of phytotoxicity. Those whose chromate solubility lies between .006 and .03 may exhibit moderate chromate phytotoxicity as shown by the representative chromates listed in the second group. The chromate phytotoxicity is not severe enough, however, to rule them out as effective fungicides, just as the moderate phytotoxicity of Bordeaux mixture or lime-sulfur to apple does not preclude their use as commercial treatments for apple foliage. Where the chromate solubility is between .006 and .0001, chromate phytotoxicity is either absent or barely discernible as illustrated by the representative chromates in the third group.

The lower limit of chromate solubility (.0001) is based on fungicidal effectiveness. As illustrated by the four chromates in the fourth group (five columns), where the chromate solubility is below this limit, the chromate radical contributes no practical fungicidal effectiveness to the product, as measured either by the slide germination tests or the greenhouse tests, or both. The fungicidal effectiveness of chromates whose chromate solubility is above .0001 is not shown in Table 1, but data are given in Table A. The lower solubility limit is a threshold limit above which the chromate radical is capable of exerting maximum fungicidal effectiveness. For chromates with solubility above this limit, the degree of fungicidal effectiveness is not affected appreciably by further increases in chromate solubility, but is affected by the choice of multivalent metal or metals used.

TABLE 1

*Significance of chromate solubility*

[Chromates with high chromate solubility, above .03]

GROUP 1

| Identification No. | Type | Chromate Solubility, 1% Suspension | Phytotoxicity Buckwheat, Bushbean, Tobacco Rating |
|---|---|---|---|
| 163 | Ca | 2.3 | 3 |
| 164 | Ca | .16 | 2.7 |
| 98 | Zn-Fe | .13 | 2.5 |
| 99 | Zn-Fe | .09 | 2.3 |
| 106 | Cd-Fe | .079 | 2.7 |
| 117 | Al-Fe | .072 | 3 |
| 143 | Fe | .081 | 2.5 |
| 130 | Fe-Ca | .09 | 2.3 |
| 134 | Fe | .045 | 2.3 |
| 135 | Cr-Fe | .075 | 2.3 |
| 137 | Fe | .084 | 2.3 |
| 141 | Fe | .071 | 2.3 |
| 159 | U-Fe | .052 | 2.3 |
| 150 | Cr-Mn | .038 | 2.5 |
| 142 | Fe-Mn | .066 | 2.3 |

[Chromates with chromate solubility within the prescribed limits.]

[Between .006 and .03.]

Group 2

| Identification No. | Type | Chromate Solubility, 1% Suspension | Phytotoxicity Buckwheat, Bushbean, Tobacco Rating |
|---|---|---|---|
| 19 | Cu | .017 | 1.3 |
| 26 | Zn-Cu | .0066 | 1.0 |
| 42 | U-Cu | .014 | 1.0 |
| 77 | Cu-Org.[1] | .0074 | 1.0 |
| 103 | Zn-Mn-Cr | .010 | 1.0 |
| 109 | Cd-Fe | .0075 | 1.0 |
| 114 | Al | .009 | 1.3 |
| 127 | Ca-Fe | .025 | 1.0 |
| 128 | Fe | .027 | 1.8 |
| 144 | Cr-Fe-Org.[1] | .019 | 1.3 |
| 153 | Co | .010 | 1.0 |
| 154 | Ni | .0095 | 1.0 |
| 155 | Ni | .0072 | 1.0 |
| 158 | U-Fe | .024 | 1.0 |
| 131 | Cr-Fe | .009 | 1.0 |
| 55 | Ba-Cu | .010 | 1.3 |

[1] Organic radical present.

[Between .0001 and .006.]

GROUP 3

| Identification No. | Type | Chromate Solubility, 1% Suspension | Phytotoxicity Buckwheat, Bushbean, Tobacco Rating |
|---|---|---|---|
| 3 | Cu | .0005 | 0 |
| 4 | Cu | .0008 | 0 |
| 5 | Cu | .0004 | 0 |
| 6 | Cu | .0001 | 0 |
| 9 | Cu | .00015 | 0 |
| 7 | Cu | .0002 | 0 |
| 8 | Cu | .0002 | 0 |
| 24 | Zn-Cu | .002 | 0 |
| 25 | Zn-Cu | .0005 | 0 |
| 27 | Zn-Cu | .0004 | 0 |
| 29 | Zn-Cu | .0024 | .3 |
| 34 | Cd-Cu | .0003 | 0 |
| 35 | Cd-Cu | .005 | 0 |
| 37 | Cd-Cu | .00016 | .7 |
| 38 | Cd-Cu | .0009 | .3 |
| 40 | Zn-Cd-Cu | .0031 | .7 |
| 41 | U-Cu | .0056 | 0 |
| 45 | Al-Cu | .0048 | 0 |
| 68 | Ce-Cu | .0029 | 0 |
| 74 | Fe-Cu | .00036 | 0 |
| 81 | Zn | .00045 | 0 |
| 84 | Zn | .0012 | .6 |
| 85 | Zn | .0014 | .6 |
| 87 | Zn-Cd | .00045 | 0 |
| 92 | Zn-Co | .0043 | .3 |
| 101 | Zn-Fe | .0039 | 0 |
| 102 | Zn-Cr | .0029 | 0 |
| 108 | Cd | .0003 | 0 |
| 148 | Cr | .0057 | 0 |
| 33 | Ca-Zn-Cu | .0015 | .6 |
| 47 | Al-Cu | .005 | .3 |
| 17 | Ca-Cu | .003 | .3 |
| 16 | Ca-Cu | .0025 | .3 |
| 50 | Ba-Cu | .0003 | 0 |
| 51 | Ba-Cu | .0007 | .6 |
| 52 | Ba-Cu | .001 | 0 |

[Chromates with chromate solubility below the lower limit.]

[Below .0001.]

GROUP 4

| Identification No. | Type | Chromate Solubility, 1% Suspension | Fungicide Tests | |
|---|---|---|---|---|
| | | | Slide Germination Tests | Greenhouse Tests |
| 156 | Pb | Nil | Very Poor | Very Poor. |
| 157 | Ba | .00007 | | Do. |
| 123 | Al-Mn-Cr | Nil | Poor | Do. |
| 162 | Bi | Nil | Very Poor | |

NOTE: The identification numbers used refer to the chromates more specifically described in Table A.

Criteria determining which metal is, or which metals are to be used in the chromate together with the hexavalent chromium are primarily the fungicidal and phytotoxic characteristics. Subsidiary criteria are:

(1) A lower cost product may be obtained by using a cheaper metal instead of one more expensive. Thus iron or aluminum may be substituted for a part of the copper in a copper chromate; chromate No. 72 or No. 44 may be used instead of No. 3.

(2) Two or more metals may be included in the chromate to broaden the range of effectiveness, including the effectiveness against other pests for which foliage treatments are used; for instance, while copper gave complete control of late blight on potatoes but only partial control of tip or hopper burn, the incorporation of cadmium, magnesium, zinc or calcium into the chromate gave good control of both.

(3) Another toxic element may be used in place of or in addition to, for instance, copper, to avoid or safen the phytotoxic action of the copper.

(4) The metal may be used to impart synergistic biological action.

(5) The metal may be used to improve the physical properties of the chromate, for instance adhesion to the plant and flowability in dusting.

Each of the complex chromates contemplated herein, from a theoretical point of view, may be considered as a complex of different chemical radicals. This may be explained in connection with the chromates $CuZn_4CrO_8.4H_2O$ (chromate No. 27, Table A) and $Cu_8CdCr_3O_{18}.9H_2O$ (chromate No. 38, Table A). These chromates may be assigned the empirical formulae $$CuO.4ZnO.CrO_3.4H_2O$$

and $8CuO.CdO.3CrO_3.9H_2O$, respectively, in conformity with metallurgical practice, that is as a firmly bonded association of the oxides of copper, zinc or cadmium, and chromium in the proportions given. The chromates may also be represented as $CuCrO_4.4ZnO.4H_2O$ or $$ZnCrO_4.3ZnO.CuO.4H_2O$$

and $3CuCrO_4.5CuO.CdO.9H_2O$ or $$2CuCrO_4.CdCrO_4.6CuO.9H_2O$$

respectively, but these representations imply a loose combination of neutral Daltonian chromates and residual oxide which the properties of the chromates fail to confirm.

Whichever formulation is used, it is to be recognized that the coefficients for each atom or radical are merely the closest small integers corresponding to the chemical analysis. Minor variations in composition as shown by analysis can be distinguished by using larger integer coefficients, but in general this is not justified since the essential properties vary slightly if at all with minor composition differences.

Further to illustrate the point mentioned above, the analyses of several batches of basic copper chromates are given below:

| Identification No. | Analysis, Percentage by Weight | | | Mols Oxide per 100 grams | | | Molar Ratio |
|---|---|---|---|---|---|---|---|
| | CuO | CrO₃ | H₂O | CuO | CrO₃ | H₂O | CuO/CrO₃ |
| 3 | 62.70 | 24.80 | 10.25 | .788 | .248 | .586 | 3.17 |
|  | 60.58 | 23.60 | 13.00 | .761 | .236 | .723 | 3.22 |
|  | 63.00 | 24.32 | 12.39 | .792 | .243 | .688 | 3.26 |
|  | 63.04 | 23.38 | 11.22 | .792 | .234 | .625 | 3.39 |
| 4 | 64.00 | 22.29 | 12.16 | .804 | .223 | .675 | 3.45 |
|  | 63.86 | 22.89 | 11.93 | .798 | .229 | .663 | 3.49 |
|  | 64.32 | 23.00 | 10.58 | .808 | .230 | .588 | 3.51 |

These may each be considered separate products since none have identical analyses, in which case large integer coefficients in the formulae would serve to identify them; or they may all be considered the same product since the analytical differences correspond to no marked differences in other properties, particularly solubility, and fungicidal and phytocidal properties. For purposes of classification a system was used whereby the first three are designated as $$3CuO.CrO_3.3H_2O$$

and the latter four as $7CuO.2CrO_3.6H_2O$ (chromates Nos. 3 and 4, respectively, Table A).

Ordinarily, for a given series of chromates, continued washing not only lowers the chromate solubility but also lowers the proportion of $CrO_3$. The proportion of $CrO_3$ fixed in the product also depends to some extent upon the thoroughness and vigor of mixing the reactants during preparation. Thus two separate batches made from the same proportions of reactants may be washed to the same chromate solubility and have slightly different proportions of $CrO_3$, or they may be washed to the same composition and have slightly different solubilities.

While obtaining the maximum fungicidal action from the chromate radical and operating in a safe range of chromate phytotoxicity by using chromates showing a chromate solubility within the limits herein given, the over-all fungicidal action as well as the phytotoxic action of the chromates can be controlled in one or more of the following ways:

(1) One heavy metal may be substituted in whole or in part by another; for instance, copper in a chromate is generally more fungicidal than zinc, and copper is also generally more phytotoxic and, particularly, is more phytotoxic to apple, than is zinc; and so copper chromates are generally preferred as less total amount of copper chromate than zinc chromate is generally required to obtain fungicidal action but, for instance, in the case of apple, the copper may be partially or wholly replaced by zinc and the specific phytotoxicity of copper to apple may thus be avoided. For use on plants which are highly resistant to phytotoxic influence, fungicidal action may be increased by using a highly fungicidal metal.

(2) The amount of heavy metal in the chromate may be varied in relation to the amount of hexavalent chromium. Due to the high fungicidal effectiveness of hexavalent chromium, it is desirable to have the proportion of $CrO_3$ to multivalent metal as high as possible, especially if the contemplated use is on a plant known to be sensitive to the metal, or if the metal is expensive. In the preparation of a chromate of any given series of chromates, for instance copper chromates, a higher proportion of the reactant containing hexavalent chromium forms a chromate having a higher proportion of hexavalent chromium up to a certain limit. For example, in simple basic copper chromates the limiting molar Cr : Cu ratio is about 1:2.5 and for basic zinc chromates the limiting Cr : Zn ratio is about 1:2. Further increases in the proportion of the chromate reactant result in losing hexavalent chromium in the mother liquor or in having $CrO_3$ so loosely bound that the product has too high a chromate solubility. In the series of potassium copper chromates, ratios as high as 1:1 have been obtained, but since these have solubilities only slightly under the upper limit, their increased fungicidal effectiveness has to be balanced against the slight chromate phytotoxicity encountered in this range.

Where the multivalent metal under consideration has desirable properties (other than fungicidal) such as giving control of insects, tip burn, or safening the effect of another metal present, it may be desirable to increase its proportion in the final product by increasing the proportion of the reactant carrying it in the preparation of the chromate. Examples are given elsewhere of metals having these desirable properties and of chromates prepared to utilize these properties.

The pH of the reacting mass from which the chromate is prepared frequently affects the proportion of hexavalent chromium. This is illustrated by comparing basic iron chromates Nos. 138 and 136. No. 138 was precipitated in an acid medium with a resulting proportion of $CrO_3$ higher than in No. 136 which was precipitated near neutral pH.

(3) A precipitated non-Daltonian chromate may be washed with water after formation or repeatedly digested with water. The water removes the mother liquor and the highly soluble constituents carried by the precipitated chromate. Further washing progressively decomposes or hydrolyses the product, usually giving a new product of progressively lower chromate solubility and lower proportion of contained $CrO_3$. This affords a means of obtaining a suitable chromate solubility if the original solubility is too high, but at the sacrifice of some chromate during washing. Thus a chromate of the empirical formula $K_2O.3CuO.3CrO_3.2H_2O$ (chromate No. 19), which has a chromate solubility of .017, upon washing or upon repeated digestions with water shows an empirical formula of $$K_2O.5CuO.3CrO_3.2H_2O$$

(chromate No. 21) and a chromate solubility of .007.

(4) A precipitated non-Daltonian chromate may be autoclaved either in the mother liquor or in fresh water. The high temperature obtained by the autoclaving renders the product in such a condition that it can subsequently be washed down to a desired chromate solubility with less washing than when washed without prior autoclaving.

(5) Beside the principal multivalent metal (essential in a fungicidal but non-phytotoxic chromate) one or more additional metals may also be incorporated in the chromate complex to obtain certain desirable effects; for example, cadmium-copper chromates, zinc-copper chromates, calcium-copper chromates, calcium-zinc-copper chromates, calcium-arsenato chromates, cobalt-copper chromates, calcium-aluminum chromates, or zinc-cerium chromates may be prepared. In all but the last two, the principal advantage obtained from the secondary metal or metals is insecticidal action, although in several cases (including the last example) the fungicidal effectiveness is improved as well. By comparing calcium-aluminum chromate (No. 116) with the other aluminum chromates (Nos. 112, 113, 114 and 115), it appears that aluminum has a slight phytotoxic action which is safened by calcium in the complex. Thus the over-all effectiveness of chromates can be further controlled by the choice of secondary metals in the complex chromate. (These are not to be confused with "addends" discussed later.)

With the foregoing principles in mind, it will be understood how the fungicidal and phytotoxic and other characteristics of the chromates may be regulated. Additional examples illustrating these principles will be given hereinafter.

In connection with the production of the chromates, for instance the copper chromates, it is found that small amounts of accidental impurities occluded from the mother liquor such as sulfate (which sometimes replaces part of the chromate in the product when, for instance, copper sulfate is used in the preparation of the chromate) have no adverse effect on fungicidal action except insofar as the substitution reduces the amount of reserve chromate present. The impurities may, however, affect the chromate solubility and consequently the phytotoxic action of the chromate. These impurities are of the type which may be removed by washing or autoclaving or digesting the chromate, or otherwise treating it in the manner stated herein to remove soluble and phytotoxic components of the chromate and to lower the chromate solubility, if necessary, to the range of chromate solubility stated herein.

The acid radical, sulfate, used in preparing chromates such as the calcium-copper chromates Nos. 12, 13, 14, 15, 16, or 17 and the calcium-zinc-copper chromates, Nos. 31, 32, or 33, remains fixed to more than a negligible extent in the final product and is thus shown in the formulae. It may be considered an inert component rather than an impurity in the chromates herein contemplated.

The chromates contemplated in this invention may be prepared by several methods. The two most general methods of preparation are as follows:

(1) Precipitation method (action of solutions to form a solid). An aqueous solution of a water-soluble salt of the multivalent metal involved, for instance the sulfate, chloride, nitrate or the like, is combined with an aqueous solution of a water-soluble material containing hexavalent chromium, for instance chromic acid or an alkali chromate or dichromate with the further addition of a basic substance, for instance an alkali or alkaline earth hydroxide, ammonia or a simple amine, for instance ethylene diamine, in order to adjust the precipitation pH. The multivalent metal chromate precipitates when the solutions are combined and thoroughly mixed. The chromate may be autoclaved in the mother liquor as described herein or be separated from the liquor by decantation or filtration or be separated by any other suitable means or methods, and washed or otherwise treated as described.

An appropriate order of mixing the reactants is to add the alkali chromate solution or equivalent to the solution containing the multivalent metal and then mix in the basic ingredient to give the desired pH which is preferably neutral unless the specific case warrants a different pH. All or a portion of the basic ingredient may be mixed with the alkali chromate solution prior to adding it to the metal solution if desired. The time and vigor of stirring must be sufficient to attain equilibrium which may occur in from about 5 minutes to about 10 hours depending upon the efficiency of the stirring equipment and the reactants involved. When the pH of the reacting mass remains substantially constant under stirring, for instance over a period of about 20 to 30 minutes, equilibrium is essentially established.

The pH of the solutions in which chromates, suitable as fungicides, are made may range from about 3 to 12. Chromate No. 138 was made at a pH of 3 and chromate No. 16 was made at a pH of 12. At about neutral pH the maximum amount of hexavalent chromium is fixed in the chromate and in this way, for any given chromate series (that is, with a given multivalent metal or combination of metals) precipitated at a given pH, the chromate solubility of the finished chromate is higher, the lower the ratio (M/Cr) of multivalent metal to hexavalent chromium; or, if the ratio M/Cr is about the same, the chromate solubility of the finished chromate is greater the more the precipitation pH deviates from neutral in either direction; or if the precipitation pH is about the same, a lower ratio of M/Cr can be obtained without too high a chromate solubility, if sufficient basic metal or its equivalent is also present, for instance calcium, potassium or ammonia. In general, however, other conditions being the same, more multivalent metal is found in the finished chromate, the higher the proportion of such metal in the reactants.

EXAMPLE 1

Following this procedure a typical basic copper chromate, similar to No. 3 (3CuO.CrO$_3$.3H$_2$O) was prepared as follows:

A solution of 22½ pounds of Na$_2$CrO$_4$ in 7½ gallons of water, another of 39 pounds of caustic soda (approximately 75% NaOH) in 15 gallons of water, and a third of 152½ pounds of CuSO$_4$.5H$_2$O in 32.7 gallons of water were made up and analyzed. On the basis of these analyses (11.88 gm. Cr$^{+6}$/100 ml. solution, 28.62 gm. NaOH/100 ml. solution, and 7.42 gm. Cu$^{++}$/100 ml. solution), and the theoretical mol requirements of 3Cu : 1Cr.4NaOH 90% of the theoretical volume of NaOH solution was added to the theoretical amount of Na$_2$CrO$_4$ solution. These volumes were all based on the whole of the CuSO$_4$ solution.

After sufficient mixing to obtain a homogeneous solution, the basic chromate solution was added to the CuSO$_4$ solution over a period of 1 hour with vigorous agitation. The slurry was digested for 17 hours at room temperature but little or no digestion should be necessary at this point. The pH was 4.68 after the addition.

Using the remainder of the NaOH solution the pH of the slurry was carefully raised to 6.6 (2.74 gallons being used) and held there for a 4 hour digest (2 hours should be sufficient) with agitation at room temperature.

The filtration and washing were done in three press loads in a Shriver plate and frame press. Filtration times were all approximately 1 hour. The first press load was washed to a concentration of 0.0001 gm. (0.001 gm./100 ml. is low enough) Cr$^{+6}$/100 ml. solution, with 25 gallons of water. The other two press loads were washed with a proportionate amount of water.

The product was dried in a Devine drier at 20–25" Hg vacuum and at temperatures of 70–90° C., micropulverized, and blended. The chromate showed, upon analysis, 58.86% CuO, 24.04% CrO$_3$, and 3.56% SO$_3$.

(2) Slurry method (action of a solution on a solid to form another solid). The metal desired, in insoluble form, for instance as an oxide or hydroxide, or carbonate is thoroughly dispersed in water to form a starting slurry. An aqueous solution of a water-soluble material containing hexavalent chromium, for instance chromic acid or an alkali chromate or dichromate or other soluble dichromate, such as copper dichromate, is then stirred into the starting slurry in sufficient amount to react with the suspended material in the starting slurry to form the desired basic metal chromate. The final mass will be a slurry of the desired basic metal chromate. If a chromate or dichromate is used rather than chromic acid, the addition of the required amount of a suitable acid, for instance sulfuric acid, will release chromic acid from the chromate or dichromate and thus assist the reaction in going to completion. Another condition of this reaction is that sufficient water must be present to allow easy mixing. The basic chromates formed may be highly hydrated, and with insufficient water present, gelling or caking may occur. Aluminum chromate No. 114 and zinc chromates Nos. 81 and 82 were prepared in this manner. Among other chromates prepared in this manner were Nos. 27, 83, 85, 87, 100, 101, 102, 108, and 109.

EXAMPLE 2

Following this procedure, a typical basic zinc chromate similar to chromate No. 82

(4ZnO.CrO₃.4H₂O)

was prepared in the following manner:

A solution of 33 pounds of anhydrous chromic acid in 6 gallons of water was made and analyzed for $Cr^{+6}$. A zinc oxide slurry was made by mixing 85 pounds of zinc oxide in 24 gallons of water until a well-dispersed slurry was obtained. On the basis of the chromic acid solution analysis (30.1 gm. $CrO_3$/100 ml. of solution) enough solution was added to the zinc oxide slurry to form the theoretical product (4ZnO.CrO₃.3H₂O). The amount of solution used in this case was 5.40 gallons or 26.1 pounds of $CrO_3$ per 85 pounds of ZnO, a molar ratio of $$4/1 \left(\frac{ZnO}{CrO_3}\right)$$

The chromic acid solution was added to the zinc oxide slurry over a period of ½ hour at room temperature. Extra water had to be added because the slurry showed a tendency to gel after the chromic acid addition. The slurry was agitated for 17½ hours at room temperature, but this length of time is not deemed necessary to have a complete reaction. The pH at the end of the digestion period was 6.64.

Filtration and washing were carried out in a Shriver plate and frame press. The filtration time was 1 hour.

The precipitate was washed with water to a $Cr^{+6}$ concentration of 0.00218 gm./100 ml. of solution. The volume of wash water flowing through the press was 900 gallons.

The cake was dried in a Devine drier under 15″ Hg vacuum in a temperature range of 70–90° C. It was then micropulverized and drummed. The chromate showed, upon analysis, 19.86% $CrO_3$ and 67.02% ZnO.

These general methods may be varied.

EXAMPLE 3

Preparation of a zinc copper chromate similar to chromate No. 27 (CuO.4ZnO.CrO₃.4H₂O). In this preparation solid ZnO was added to a slurry of freshly precipitated Cu(OH)₂ made by adding a caustic soda solution to a CuSO₄ solution. No reaction between the ZnO and Cu(OH)₂ took place until a solution of chromic acid was added, at which point the insoluble chromate formed.

A solution of copper sulfate was made up using 75 pounds of CuSO₄.5H₂O in 81 gallons of water and analyzed for gm. $Cu^{++}$/100 ml. of solution.

Another solution of 30 pounds NaOH in 18 gallons of water was made up and analyzed for gm. NaOH/100 ml. of solution. On the basis of these analyses the theoretical amount of NaOH solution was added to the whole of the CuSO₄ solution to form the precipitate of Cu(OH)₂. The analysis of the CuSO₄ solution was 2.89 gm. $Cu^{++}$/100 ml. of solution, and that of the NaOH solution was 18.9 gm. NaOH/100 ml. of solution, so 16.11 gallons of NaOH solution were added to 83.8 gallons of CuSO₄ solution. The solution was added over a period of 1 hour and the resulting slurry was digested with agitation for 2 hours at room temperature. Although the Na₂SO₄ formed could be washed out by a separate filtration, it was allowed to remain in solution until the final filtration.

After the digestion, ZnO was added to the slurry in solid form. The theoretical amount was used to give the desired mol ratio in the product of 4Zn : 1Cu. This amount, 103.5 pounds, was added over a period of 1 hour and the slurry was agitated for 10½ hours at room temperature, although about 2 hours would probably be sufficient.

The chromic acid was made from an analyzed solution of Na₂Cr₂O₇ (45 pounds Na₂Cr₂O₇ in 11 gallons of water) by adding the theoretical amount of H₂SO₄ (66° Bé). The analysis of the Na₂Cr₂O₇ solution was 13.38 gm. $Cr^{+6}$/100 ml. of solution, and 91.6 pounds of H₂SO₄ were added over a period of 1⅓ hours. The solution was digested with agitation for 1 hour at room temperature and a sample was again analyzed for gm. $Cr^{+6}$/100 ml. of solution. On the basis of the last analysis (9.56 gm./100 ml.) and the previous CuSO₄ solution analysis, 20.8 gallons of chromic acid solution were found necessary to form the product with the desired mol ratio of 1Cr–1Cu. This volume was added to the slurry over a ¼ hour period and the slurry was digested with agitation for 4 hours at room temperature.

The final pH of the slurry was 5.3. Since it is possible in this case to lose Cr from the product due to its solubility in an acidic solution the pH was brought up to 6.95 with caustic soda solution. The pH was held at 6.95 while the slurry was digested for 2 hours to be sure the pH would remain constant during filtration.

Filtration and washing was done in a Shriver plate and frame press. The filtration time was 1⅓ hours. Water was used for washing and a total of 650 gallons was fed to the press. Washing was continued to a concentration of 0.0009 gm. $Cr^{+6}$/100 ml. of solution.

The washed product was dried in a Devine drier under 15″ Hg vacuum in a temperature range of 70–90° C. After drying it was micropulverized and drummed. The chromate showed, upon analysis, 14.06% $CrO_3$, 12.32% CuO, 53.78% ZnO, and 5.42% $SO_3$.

EXAMPLE 4

Preparation of a calcuim copper chromate similar to chromate No. 16

(10CaO.3CuO.CrO₃.3SO₃.21H₂O)

In this preparation a solution (CuSO₄) was reacted with another solution (Na₂CrO₄) to form a slurry. A suspension (Ca(OH)₂) in water was then added to the slurry and the Ca was absorbed in the original precipitate.

A solution of 93.5 pounds of CuSO₄.5H₂O in 94 gallons of water was made up and analyzed (3.13 gm. Cu++/100 ml. of solution) and another solution of 32 pounds of Na₂CrO₄ in 10 gallons of water was made up and analyzed (9.82 gm. Cr⁺⁶/100 ml. of solution). On the basis of these analyses the theoretical volume of Na₂CrO₄ solution was added to the whole of the CuSO₄ solution to obtain the mol ratio of 3Cu : 1Cr. in the resulting precipitate. This volume was 8.05 gallons and was added at room temperature over a period of ½ hour. The slurry was digested with agitation for 6 hours but a 2 hour digestion should be sufficient. The final pH was 4.1.

The Ca(OH)₂ suspension was made using the theoretical amount of lime, 100.1 pounds (70.0% CaO), in 100 gallons of water. This theoretical weight was calculated based on the Cu⁺⁺ solution to form the product with a mol ratio of 3Cu : 10Ca. The suspension was added to the slurry over a period of 1 hour at room temperature and the resulting slurry was digested with agitation for 7 hours at room temperature. Here again 3 or 4 hours should be a long enough digestion for complete reaction. The final pH was 12.3.

The slurry was filtered through a Shriver plate and frame filter press. The filtration time was 1 hour.

Water was used as a wash and the washing was continued to a concentration of 0.001 gm. Cr⁺⁶/100 ml. of solution, at which point 540 gallons of water had been fed to the press.

The product was dried in a Devine drier under 15" Hg vacuum and at temperatures of 70–90° C. It was then micropulverized and drummed. The chromate showed, upon analysis, 16.85% CuO, 39.25% CaO, 6.56% CrO₃, and 13.70% SO₃.

EXAMPLE 5

For further examples, the potassium copper chromate, K₂O.3CuO.3CrO₃.2H₂O (No. 19) was made by dissolving 48.3 parts (by weight) of copper nitrate in 200 parts by weight of water (solution A) and stirring into this a solution (solution B) made from 38.8 parts of potassium chromate, K₂CrO₄ in 75 parts water, then KOH was added to neutral pH.

EXAMPLE 6

The chromate of Example 5 was also made by dissolving 97.6 parts (by weight) of copper oxide in 450 parts by weight of chromic acid (1 part CrO₃ to 1 part H₂O by weight) to give copper dichromate. To this was added about 224 parts by weight of potassium hydroxide in an equal weight of water which precipitated the potassium copper chromate, and served to adjust the pH to neutral.

The chromates of Examples 5 and 6 had the same chromate solubility, toxic effects and other characteristics whichever way they were made.

Chromates precipitated at various temperatures from room temperature up to the temperature of the boiling solution of reactants all were satisfactory. In some cases chromates were washed and then, without intermediate drying and pulverizing, applied to the plant (chromates Nos. 5, 6, 8, and 9) again with satisfactory results.

Instead of preparing the chromate fungicides from relatively pure reactants, as in the previous examples, it is contemplated that they may be prepared from properly treated chromium ore. To this end a chromium ore, for instance the one known as chromite, is treated as in commercial practice to yield soluble chromates and dichromates in a series of steps. The first chemical reaction involves oxidizing the major portion of the chromium to the hexavalent state and rendering it soluble in water or dilute acid. A typical chromite was pulverized, mixed with limestone, soda ash, and coal, and roasted in a rabble furnace at a temperature above the fusion point of sodium carbonate for 8 to 10 hours and then at a temperature below the fusion point for an additional 8 to 10 hours.

The product at this point, referred to as chrome ore calcine, is about 80% soluble in dilute sulfuric acid. The acid soluble portion of the chrome ore calcine used in preparing the chromates described had the following approximate analysis:

| | Per cent |
|---|---|
| CrO₃ | 28.60 |
| CaO | 36.64 |
| Fe₂O₃ | 7.0 |
| SiO₂ | 6.32 |
| Al₂O₃ | 5.9 |
| MgO | 4.28 |
| Cr₂O₃ | 3.4 |
| FeO | 0.41 |
| MnO | 0.02 |

A suspension of chrome ore calcine in water (wherein some of the chromate dissolves) may be used in place of a solution of sodium chromate in the precipitation of chromate fungicides. Chromates Nos. 2A and 2B are typical of those prepared in this manner. The ore residue is carried along and acts merely as a diluent in the final product.

Chromate No. 2C was prepared from a batch of ore that was only partially roasted (about 46% conversion to Cr⁺⁶).

Additional experimental data on these chromates is given in Table 2 below:

TABLE 2

| Identification No. | Formula | Suspension, pH | Chromate [1] Solubility, 1% Suspension |
|---|---|---|---|
| 2A | 10CaO.3CuO.CrO₃.2SO₃.20H₂O ore residue (10% by weight). | 7.5 | .004 |
| 2B | 20CaO.5CuO.2CrO₃.4SO₃.40H₂O ore residue (13% by weight). | 12.2 | .009 |
| 2C | 11CuO.3CrO₃.11H₂O ore residue (42% by weight). | 7.3 | .009 |

[1] In determining chromate solubility one gram of the chromate including the ore residue was used per 100 cc. of water.

TABLE 2 (Continued)

| Identification No. | Slide Germination Tests, LD50 | | Per Cent Disease, Greenhouse Tests, Rapid | | Phytotoxicity Buckwheat, Bushbean, Tobacco |
|---|---|---|---|---|---|
| | S. f. | A. s. | Late Blight | Early Blight | |
| 2A | 9.6 | 14.6 | | 14 | .3 |
| 2B | 5.0 | 3.4 | 10 | | 0 |
| 2C | 3.4 | 2.2 | 1.6 | 2.6 | .5 |

NOTE: The tests are described later in this specification under the heading "Tests."

It is contemplated that complex chromates which are formed at the point of application (in the mixing tank in the field preparatory to foliage spraying) may be used. These belong to that class of foliage-treating materials known as tank-mixes. Bordeaux mixture is usually as a tank-mix, the blue vitriol and lime being added to the water at the point of application. The two solid ingredients of the Bordeaux mixture are stored separately and added separately to the water, since reaction and caking will occur if the solids are mixed. Thus Bordeaux is a two-step tank-mix. Where the solids of the chromates contemplated herein are compatible, they may be mixed and stored in advance, and thus the tank-mix in the field is prepared in a single step. This is a decided advantage, and a feature of a number of the chromates disclosed herein is that the solids may be compounded in the proper proportion and stored, and then, merely by mixing with water at the point of application, an efficient chromate fungicide of the type contemplated may be prepared in a simple step by the user.

In Table 3 typical tank-mixes are described in three ways: (1) the proportions of solid ingredients, (2) the percent of active metal oxide in the solid mix as ZnO, CuO, and CrO$_3$, and (3) the atomic ratio of the the principal multivalent metals. In the typical mixtures described it is possible that some chemical reaction takes place, but if it interferes with the handling properties of the materials, when stored for a period of at least a year, the reactants should separately be packaged.

The dosage, or proportions of total solids to water in the final mix, will, of course, depend upon desired concentration of the active chromate. In the greenhouse fungicide tests on early blight and late blight control, 0.2% dosage was employed, and in the phytotoxicity tests on buckwheat, bushbean and tobacco, 1% dosage was used.

The source of chromate may be sodium chromate as in No. 3A, or chrome ore calcine as in the other tank-mixes tabulated. Calcium may be added as lime or limestone and is also contained in the chrome ore calcine. Since field tests show that calcium has a function in repelling leaf hopper and flea beetle, it is included in the atomic ratio table. Components of chrome ore calcine other than calcium and chromium are not included in the atomic ratio table.

Chromate No. 3Q is typical of a chromate tank-mix which does not contain copper, illustrating the fungicidal properties of chromates per se.

Those tank-mixes with a caking index of 3 should be used soon after they are compounded or the reactants should separately be packaged; but the others may be compounded and then packaged for the one-step prepartion of a fungicide. The chromate solubility of No. 3P is too high, and the chromate phytotoxicity is correspondingly high, illustrating that the solubility restriction developed for fixed chromate fungicides also applies in the case of tank-mix chromates.

Field tests of chromate No. 3A at concentrations of 2.5 pounds and 5 pounds per 100 gallons of water and of chromate No. 3M at concentrations of 8.5 pounds and 9.5 pounds per 100 gallons of water applied to potatoes confirmed their lack of chromate phytotoxicity.

As in the case of Bordeaux mixture where the ratio of lime to blue vitriol may be varied within wide limits, so in the case of chromate tank-mixes the formulae given are not to be construed as rigid. Variations in proportions may be made as long as the resultant mixture has a standard chromate solubility below .03, although variations in proportions may change the caking index.

Similarly the chrome ore calcine need not have the exact composition of the material actually used. Its successful use in tank-mixes illustrates that an intermediate product in the commercial production of an alkali dichromate from chrome ore may be used as a cheap source of chromate in preparing tank-mixes. Any intermediate product resulting from roasting the ore so as to oxidize and solubilize the major portion of the chromium may be used. The other metals present have been shown to be harmless and act merely as diluents. Other sources of hexavalent chromium such as calcium, potassium or magnesium chromates or dichromates or sodium dichromate may also be used.

TABLE 3

| Identification No. | Chromate Solubility, 1 Per Cent Suspension | Phytotoxicity Buckwheat, Bushbean, Tobacco | Per Cent Disease, Greenhouse Tests, Rapid | |
|---|---|---|---|---|
| | | | Late Blight | Early Blight |
| 3A | .023 | .7 | 17 | |
| 3B | .0124 | 1.3 | 16 | |
| 3C | .0127 | 1.3 | 19 | |
| 3D | .0215 | .7 | 3 | |
| 3E | .0236 | 1.0 | 5 | |
| 3F | .023 | 1.5 | 2 | 9 |
| 3G | .022 | 1.3 | | 10 |
| 3H | .009 | .7 | 3 | |
| 3I | .026 | .7 | 12 | |
| 3J | .011 | 1.7 | 0 | |
| 3K | .010 | 1.0 | 5 | |
| 3L | .015 | .7 | | 20 |
| 3M | .026 | 0 | | 12 |
| 3N | .028 | 1.5 | | 10 |
| 3P | .053 | 2.0 | | |
| 3Q | .029 | 1.5 | 15 | 20 |

NOTE: In determining the chromate solubility one gram of total mix was used per 100 cc. of water.

TABLE 3 (Continued)

| Identification No. | Type | Caking Index (1 year) | Lb. of Ingredients Per Lb. of CuSO$_4$.5H$_2$O (97%) | | | | |
|---|---|---|---|---|---|---|---|
| | | | A | B | C | D | E |
| 3A | Cu | 2 | .216 | | | .193 | 1.0 |
| 3B | Cu | 2 | | .45 | | | 1.3 |
| 3C | Cu | 2 | | .68 | | | 1.95 |
| 3D | Cu | 1 | | 1.36 | | | 3.9 |
| 3E | Cu | 0 | | 2.72 | | | 7.8 |
| 3F | Cu, Al | 0 | | 1.36 | [1]1.29 | | 3.0 |
| 3G | Cu, Fe | 2 | | 1.36 | [2]1.08 | | 3.0 |
| 3H | Cu, Fe | 2 | | .68 | [2].54 | | 1.5 |
| 3I | Cu, Zn | 3 | | 1.36 | .32 | | |
| 3J | Cu, Zn | 3 | | .68 | .16 | | |
| 3K | Cu, Zn | 3 | | .68 | .16 | | .63 |
| 3L | Cu, Zn | 2 | | 1.36 | .64 | | 3.1 |
| 3M | Cu, Zn | 1 | | 1.79 | .96 | | 1.08 |
| 3N | Cu, Zn | 0 | | 2.72 | .96 | | 3.0 |
| 3P | Cu, Zn | 3 | | 2.72 | .32 | | |

| | | | Per Lb. of ZnO | | | | |
| 3Q | Zn, Fe | 0 | | 2.16 | [2]3.44 | | |

NOTE: Re Caking Index:
 0=free flowing.
 1=breaks up readily on shaking.
 2=can easily be broken down with a stick or spatula.
 3=caked into lumps; reactants preferably packaged separately.

NOTE: Re Lb. of Ingredients:
 A=Na$_2$CrO$_4$ (97%).
 B=Chrome ore calcine (28.6% CrO$_3$).
 C=ZnO, or other material as indicated:
  [1]=Al$_2$(SO$_4$)$_3$.18H$_2$O.
  [2]=Fe$_2$(SO$_4$)$_3$.9H$_2$O.
 D=Ca(OH)$_2$.
 E=CaCO$_3$ (limestone).

TABLE 3 (Continued)

| Identification No. | Per Cent Active Metal Oxide in Mix | | | Atomic Ratio of Metals | | | | |
| --- | --- | --- | --- | --- | --- | --- | --- | --- |
| | ZnO | CuO | CrO₃ | Ca | Zn | Cu | Cr | Al or Fe |
| 3A | | 12.6 | 5.3 | 10 | | 3 | 1 | |
| 3B | | 11.2 | 4.7 | 12 | | 3 | 1 | |
| 3C | | 8.5 | 5.4 | 12 | | 2 | 1 | |
| 3D | | 5.0 | 6.2 | 12 | | 1 | 1 | |
| 3E | | 2.7 | 6.8 | 12 | | 0.5 | 1 | |
| 3F | | 4.6 | 5.8 | 10 | | 1 | 1 | 1 Al. |
| 3G | | 4.8 | 6.0 | 10 | | 1 | 1 | 1 Fe. |
| 3H | | 8.3 | 5.2 | 10 | | 2 | 1 | 1 Fe. |
| 3I | 11.8 | 11.5 | 14.5 | 2.3 | 1 | 1 | 1 | |
| 3J | 8.6 | 16.8 | 10.6 | 2.3 | 1 | 2 | 1 | |
| 3K | 6.4 | 12.4 | 7.9 | 6 | 1 | 2 | 1 | |
| 3L | 10.5 | 5.1 | 6.5 | 10 | 2 | 1 | 1 | |
| 3M | 19.8 | 6.5 | 10.6 | 4.4 | 2.3 | 0.77 | 1 | |
| 3N | 12.2 | 4.0 | 10.0 | 6.1 | 1.5 | 0.5 | 1 | |
| 3P | 7.8 | 7.6 | 19.3 | 2.3 | 0.5 | 0.5 | 1 | |
| 3Q | 15.1 | | 9.3 | 2.3 | 2 | | 1 | 2 Fe. |

Following the principles illustrated above, to facilitate operations the proper amounts of the required reactants may be packaged, either dry or in concentrated solutions, and either ready-mixed (where suitable) or in separate containers containing the correct proportionate amounts of one or more of the reactants, so that a spray may quickly be made for use merely by emptying the entire contents of a package in a stated amount of water and stirring for a stated length of time to give a tank mix. The reactant containing the hexavalent chromium may be obtained merely by roasting a chromium ore.

TESTS

The fungicidal properties of representative chromates were tested in one or more of the following ways:

(1) *Slide germination tests.*—Essentially these tests consisted of germinating spores in continual contact, on glass slides, with given concentrations of the chemical under test. The germination was observed after 24 hours and the amounts of the chemical needed to inhibit germination of 50% and 95% (L. D. 50 value and L. D. 95 value, respectively) of the spores were determined. The procedure is more fully set forth in a paper entitled "The slide-germination method of evaluating protectant fungicides," published in Phytopathology, July 1943, vol. XXXIII, No. 7, pp. 627-632. Four different and typical fungi were used for this test. The fungi tested were *Sclerotinia fructicola* (Wint.) Rehms, which causes brown rot of stone fruits such as cherries, peaches and the like; *Alternaria solani* (Ell. and Mart.) Jones and Grout, which causes leaf spot (early blight) on tomatoes; *Glomerella cingulata* (St.) Sp. and von S., which causes bitter rot of apples; and *Macrosporium sarcinaeforme* Cav., which causes a leaf spot on clover. These are all Eumycetes. The fungi are indicated on the tables herein by their initials S. f., A. s., G. c., and M. s., respectively. The numerals on the tables give the parts by weight of the chromates under test, in a million parts by weight of liquid, to prevent the germination of 50% and 95% of the spores. The liquid used which, of itself, did not inhibit germination of the spores, was distilled water containing 0.1% of ultra-filtered orange juice, which was added to the water to obtain a high and consistent germination of the fungous spores.

The compositions used in the foregoing tests were made in the following manner: A number (usually 10) of compositions of different concentrations of the chromate under test were made. The compositions varied by either 2-fold or the √2 fold, so adjusted on the basis of preliminary tests that concentrations on both sides of the L. D. 50 and L. D. 95 values were covered. Thus for chromate No. 3 a series was prepared consisting of 10, 7.07, 5.00, 3.53, 2.50, 1.76, 1.25, .88, .62, and .44 parts of the chromate in 1,000,000 parts of water (parts by weight).

(2) *Greenhouse test.*—(a) *Percent disease tests.*—Late blight is very serious on potatoes; early blight and Septoria leaf spot are serious on tomatoes. All of these fungi develop however, on tomato which can easily and quickly be grown and which was therefore chosen as the test plant. The tests were made by preparing aqueous 0.2% (by weight) suspensions of the fungicidal chemical and spraying individual plants with one (but not more than one) suspension. Check or control plants were not sprayed with the fungicidal sprays. As soon as the spray dried (usually about 2 hours after spraying) each plant was inoculated with the spores of either one or another of the fungi so that, for instance in the case of chromate No. 3, at least three plants were sprayed with aqueous 0.2% sprays of this chromate, then permitted to dry and then a group of one or more sprayed plants and one or more control plants was inoculated with early blight, another group was inoculated with late blight and another group with Septoria leaf spot. All of the plants were then subjected to 100% humidity for 12 hours to allow infection to take place and were then removed to a greenhouse where disease readings were taken about 3 days later in the case of late and early blight and about 10 days later in the case of Septoria leaf spot. The figures under the designations "Percent disease—late blight," "Percent disease—early blight," and "Percent disease—Septoria leaf spot" represent the percent of diseased leaves on the sprayed plants, considering the number of diseased leaves on the unsprayed or control plants as 100%. The 0.2% spray concentration was chosen because it is representative of commercial uses, and permitted differentiation between compounds (McCallan and Wellman, Contributions from Boyce Thompson Institute, vol. 13, pp. 93-134, 1943).

(b) *Weathering—late blight tests.*—In these tests plants were sprayed with an aqueous 1% spray of the chromate under test. The spray was then allowed to dry. The sprayed plants and unsprayed control plants were then subjected to 3 complete cycles of alternate humidity, rain and sunshine over a space of 10 to 14 days, the plants being subjected (as one complete cycle) to greenhouse conditions for 60-84 hours, then to 100% humidity for 12-15 hours, then to ½ inch of a water spray simulating rain. After a given number of cycles, the plants were inoculated with the spores of *Phytophthora infestans*, the cause of late blight, then subjected to 100% humidity for 12 hours, and then removed to a greenhouse where disease readings were taken about 3 days later. The figures under the designation "Weathering—late blight" represent the percent of diseased leaves on the sprayed plants, considering the number of diseased leaves on the control plants as 100%. The 1% spray concentration was chosen because it is about the highest concentration of the average chromate in the average spray which, it is contemplated, will be applied to plants in the field when the chromates are used commercially.

A spray containing 1% of tribasic copper sulfate, a commercially-used material, gave an average value of 15% disease under this weathering test.

In the majority of instances, as is indicated on Table A, fungicidal characteristics were determined by both the slide germination tests and the greenhouse tests although, in a few instances, one or the other of these tests or a part of a test was omitted.

(3) *Phytotoxicity tests.*—(a) *Buckwheat, bushbean, and tobacco tests.*—Tobacco, buckwheat, and bushbean were chosen as test plants for determining phytotoxicity in the greenhouse, since they represent economically important families and since they are suitable for greenhouse use. (This composite test is called the B. B. T. test.)

At least one plant from each species was sprayed on a revolving turntable with a 1% aqueous suspension of the chemical. This was done under standard conditions, and the method is described in greater detail in Contributions from Boyce Thompson Institute, vol. 13, page 172.

The plants were then held in the greenhouse for several days until phytotoxicity was at its maximum. The results as noted by a trained observer were recorded as follows:

0=no injury
1=trace of injury
2=moderate injury
3=severe injury

The data presented herein concerning B. B. T. tests are averages of the ratings determined for the three species. Chromates having a phytotoxicity rating of 2 or above are considered to be too phytotoxic to be pratical.

(b) *Tomato tests.*—Tomato plants were treated in the manner described in the "Weathering—late blight tests" and the injury to the plant due to the phytotoxic effects of the chromate was noted by an observer.

The phytocidal injury of the plants was rated according to the foregoing schedule.

The figures in the tables under Buckwheat, bushbean, tobacco and under Tomato represent the average injury rating of all of the plants sprayed with the indicated chromate when the above phytotoxicity tests were made.

In a number of instances both types of phytotoxicity tests were made for the same chromate but more frequently either one or the other of the tests was run. In addition, many of these chromates were tested in the field.

For a field test on apple trees against the primary or spring infestation of apple scab, three spray compositions were made from each of the chromates shown on Table 4 at concentrations of 3.1 and 0.33 lbs. of the respective chromates per 100 gallons of water, corresponding to 0.36, 0.12, and 0.04% of the chromate by weight. As a control, a spray of standard lime sulfur was used at a concentration of 16 lbs. per 100 gallons of water. The lime sulfur was a commercial product containing lime, sulfur and water in the approximate proportions of 50 lbs. of quick lime, 100 lbs. of flowers of sulfur and sufficient water to make 50 gallons. The commercial product is prepared by boiling these ingredients together for approximately one hour, maintaining the volume constant, until a reddish-brown color develops. The trees were sprayed about the middle of April, the first of May and the middle of May. Readings were taken about the last of May. Spraying was so conducted that any given branch was treated with only one spray composition. The sprays of the lower concentrations controlled the scab almost as well as the sprays of the higher concentrations; hence the results are given as the average percent of spur leaves free from the scab for all concentrations, as well as the average for the two lower concentrations which indicates that the higher concentration is about three times the necessary concentration. The chromates gave, at most, only slight injury and, in the majority of cases, no injury at the lower concentrations. The specific phytotoxicity of copper to apple was inappreciable in the cases of chromates Nos. 26 and 44 (Table 4) in which part of the copper has been substituted by zinc and aluminum respectively.

The field tests on the apple trees show that the chromates tested were about equally as effective as the lime-sulfur control spray. Furthermore, from three to nine times the effective dose was still essentially nonphytotoxic. Such range between effectiveness and injury does not exist with either lime-sulfur or Bordeaux mixture on apples.

TABLE 4

| Fungicide | Average Per Cent Clean Leaves | | Remarks |
|---|---|---|---|
| | All Concentrations | Two Lower Concentrations Only | |
| None—no spray (check). | 13 | | |
| Lime-sulfur control | 61 | | Slight injury. |
| Identification No.: | | | |
| 26 | 58 | 59 | No injury. |
| 44 | 59 | 59.5 | Possibly slight injury. |
| 82 | 62 | 64.5 | No injury. |
| 89 | 64 | 64 | Do. |
| 91 | 56 | 56 | Do. |
| 96 | 60 | 56 | Do. |
| 100 | 63 | 58 | Do. |
| 102 | 62 | 56.5 | Do. |
| 109 | 62 | 59 | Slight injury only at the high concentration. |
| 115 | 58 | 60.5 | Possibly slight injury. |
| 116 | 58 | 60 | No injury. |
| 126 | 56 | 55 | Do. |
| 146 | 57 | 53 | Do. |
| 147 | 52 | 53 | Do. |

Representative chromates described herein were tested as insecticides against representative insects. The term "insecticide" is used to denote a material for the protection of the plant against the mature as well as the immature forms of the insect whether the protection is afforded by killing or by repelling. For tests against cankerworm, Colorado potato beetle, and Japanese beetle, excised leaves of appropriate food plants were selected or cut to uniform size and sprayed on both surfaces with a 1% aqueous solution of the chemical under test, by means of an atomizer. The plants used were: elm (for cankerworm), tomato (for Colorado potato beetle), and Boston ivy (for Japanese beetle). After drying, a leaf was placed on a rack in a covered Petri dish, in which humidity was maintained by moistened filter paper covering the bottom of the dish. Five of the species of insect under test were then introduced and allowed to feed. When the untreated check leaves were completely eaten (usually after about 24 hours) a percent estimation was made of the leaf area eaten of the treated leaves.

For tests against the potato flea beetle, a 250 cc. Erlenmeyer flask was lined on the bottom with moist filter paper. Uniform size sections of tomato leaves were sprayed on both surfaces with a 1% concentration of the chemical under test and after the leaf sections were dry they were laid on the bottom of the flask and 10 flea beetles were introduced in the flask to feed upon the leaf. The mouth of the flask was covered with a double thickness of cheesecloth, held in place by a rubber band. When the untreated check leaf was entirely destroyed (usually after 3 or 4 days), an estimate was made of the leaf damage on each of the treated leaves.

The results of the tests are shown on Table A, the ratings being as follows:

| Rating | Per Cent Leaf Area Eaten Relative to Check | |
|---|---|---|
| | Cankerworm, Potato Beetle, Flea Beetle | Japanese Beetle |
| | Per cent | Per cent |
| A | <5 | <15 |
| B | 6-15 | 18-40 |
| C | 16-40 | 41-70 |
| D | 41-70 | 71-95 |
| E | >71 | >96 |

These tests differ from field conditions, in that with insects enclosed within a vessel the insect has a choice of either eating the treated leaf or starving, whereas in a field test the insect, if it does not wish to feed upon the treated plant, usually can find untreated plants upon which to feed.

Insecticide tests show that insecticidal action is unpredictable from a knowledge of fungicidal action, but certain types of chromates show specific insecticidal action toward certain insects as shown in Table A and the field tests described below.

Insecticide field tests indicate that chromates containing zinc, cerium and arsenic are effective in the control of Mexican bean beetle, Colorado potato beetle or leaf hopper on potatoes, tomatoes, beans, cabbage or cucumber and that none of the chromates tested were phytotoxic to these representative plants. The best chromate types for general insecticide control are copper-cadmium chromates and copper-cobalt chromates.

From the tests it will be seen that among the chromates contemplated herein certain types of chromates are quite effective against certain insects: thus zinc chromates, cadmium chromates, arsenato chromates, and copper-zinc chromates operate well against Colorado potato beetle; arsenato chromates, copper-zinc chromates, and copper-cobalt chromates operate very well against insects in general; and copper-cadmium chromates are superior in insect control to both copper chromates and cadmium chromates and thus exhibit synergism.

In a series of field tests, data were obtained on representative chromates respecting the control of Colorado potato beetle larvae, leaf hopper, and flea beetle. In the potato beetle tests, potato plants were sprayed with the spray composition (4 lbs. of the respective chromates per 100 gallons of water), potato beetle larvae which had been collected from an untreated field were broadcast over the treated field and the number of larvae on the treated plants and on untreated check or control plants were counted 36 hours and 72 hours later. The count at 72 hours did not differ from the count at 36 hours. The untreated plants showed 422 larvae, the plants treated with chromate No. 68 showed 7 larvae, the plants treated with chromate No. 70 showed 29 larvae, those treated with chromate No. 81 showed 40 larvae, those treated with chromate No. 82 showed 42 larvae, and those treated with chromate No. 27 showed 98 larvae.

In the leaf hopper tests, potato plants located in a field subjected to ravages by the insects were sprayed with aqueous spray compositions containing, respectively, the chromates Nos. 68, 70, 81, 82, and 27 at a concentration of 4 pounds of each of the chromates per 100 gallons of water. The leaf hopper injury usually starts as a spot of dead leaf tissue at the apex of the leaflet and a count of leaflets having injuries due to the insects showed a mean number of injured leaflets of 15.3, 16.0, 20.5, 21.2, and 22.7 for chromates Nos. 27, 82, 81, 68, and 70, respectively, as against 98.9 for untreated check or control plants. The plants were given only a single treatment during the early part of July and the injury count was made about two weeks later. In a field test on string beans, counts made 72 hours after spraying with chromate No. 27 (4 pounds per 100 gallons) showed an average of 6 leaf hopper nymphs per 20 leaves as against an average of 35.4 nymphs for untreated check plants.

Numerous chromates containing copper were prepared and tested according to one or more of the tests previously described. Data with respect to the chromates are given on Table A.

Considering the most simple combinations of copper and chromium, represented by chromates Nos. 1 through 11, inclusive, it will be seen that these afford very good control of both late and early blight and have low phytotoxicity and low chromate solubilities.

Copper chromates may be in the low range of chromate solubility or, if an alkali or amino group is present, in the high solubility range.

In a field test on potatoes, chromate No. 4 controlled late blight as well as Bordeaux mixture made with 8 pounds of blue vitriol and 8 pounds of hydrated lime in 100 gallons of water. (This will hereinafter be referred to as Bordeaux mixture 8-8-100 in accordance with standard practice.) The chromate spray contained 3 pounds of the chromate per 100 gallons of water. The plants in the respective plots were given the same number of sprayings at the same time. No evidence of phytotoxic injury was observed on the plants treated with the chromate spray.

In another potato field test, chromate No. 5 was used after washing but without drying. Necessary amounts of water were added to yield slurries of 1 pound and 3 pounds of the chromate per 100 gallons and controlled late blight comparable to Bordeaux mixture (8-8-100).

Laboratory fungicide tests show that copper chromates are more effective than would be predicted from the toxicity of other copper compounds and chromates containing no other toxic metal. The copper chromates are synergistic, having a toxic effect greater than additive.

The toxicity of copper chromates is due to both the $CrO_3$ content and the $CuO$ content. The L. D. 50 of Bordeaux mixture based on copper sulfate hydrate and averaged over all four fungi tested in the laboratory is 14.1 (geometric averages are used throughout). Even the more toxic blue vitriol alone has an L. D. 50 value of 7.1. Based on CuO content these values become 4.48 and 2.26, respectively, or 3.16 when averaged geometrically. This value is L. D. $50_{CuO}$; and the value $1/L.D.50_{CuO}$ is a measure of the inherent toxicity of CuO combined in any compound.

In order to obtain a corresponding value for the inherent toxicity of $CrO_3$ combined in any compound (with chromate solubility above .0001) the following table is compiled listing 15 typical chromates containing no other metals which are toxic to fungi. Only the first five are suitable for foliage use because of phytotoxicity restrictions, but the remainder are suitable for calculating the inherent toxicity of $CrO_3$ to fungi. The second column in the following Table 5 is the geometric average of the L. D. 50 for the four fungi tested. The third column is the weight fraction of $CrO_3$ obtained by analysis. The last column lists the product of the values in the second and third column or the L. D. 50 based on $CrO_3$.

TABLE 5

*Inherent toxicity of $CrO_3$ to fungi*

| Identification No. | Average L. D. 50 | Weight Fraction $CrO_3$ | L. D. 50 $CrO_3$ |
|---|---|---|---|
| 127 | .58 | .137 | .08 |
| 129 | 3.9 | .046 | .18 |
| 144 | 2.7 | .193 | .52 |
| 138 | 3.6 | .283 | 1.02 |
| 136 | 11.67 | .087 | 1.01 |
| 132 | 1.05 | .282 | .30 |
| 133 | .97 | .547 | .53 |
| 134 | 1.00 | .169 | .17 |
| 141 | .88 | .500 | .44 |
| 143 | .78 | .231 | .18 |
| 139 | 1.01 | .376 | .38 |
| 140 | .93 | .247 | .23 |
| 137 | .43 | .444 | .19 |
| 163 | .63 | .632 | .40 |
| 164 | .66 | .444 | .29 |

The geometric average of L. D. $50_{CrO_3}$ is .32 with 8 values below and 7 above, and no particular correlation with the type or amount of other metals present or with chromate solubility (see Table A). Thus L. D. $50_{CrO_3}$ based on these 15 products may be considered representative; and $1/L.D.50_{CrO_3}$, the inherent toxicity of $CrO_3$ to fungi, is 3.13.

Where two or more toxic agents are applied simultaneously, the sum (S) of the weight fractions of toxic components is multiplied by the average L. D. 50 based on total weight to give L. D. $50_T$, based on total weight of toxic ingredients only. The individual weight fraction of any toxic component divided by S gives the weight factor (W) for that toxic component.

The formula for similar joint action where two or more toxic agents are applied simultaneously is:

$$\frac{1}{L.D.50_T} = \frac{W_a}{L.D.50_a} + \frac{W_b}{L.D.50_b} + \cdots \frac{W_n}{L.D.50_n}$$

Applying this formula to chromates of copper containing no other metal toxic to fungi, the geometric average L. D. 50 for the four fungi tested (Table A) was found for the chromates 2, 3, 4, 15, 16, 19, 20, 21, 22, 48, 49, 50, 51, 52, 53, 54, 55, 70, 72, 73, and 74. Each of these values was multiplied by S obtained from analysis to give the corresponding experimental L. D. $50_T$. The calculated L. D. $50_T$ (from the above formula) was then compared with the experimental L. D. $50_T$ to test for synergism. The geometric averages of the experimental and calculated L. D. $50_T$ for the 21 copper chromates are:

| | Average, L. D. $50_T$ | $\frac{1}{L.D.50_T}$ = joint toxicity |
|---|---|---|
| Calculated | .64 | 1.56 |
| Experimental | .29 | 3.45 |

Thus the toxicity is greater than additive and synergism is manifested.

The formula for similar joint action of toxicants is developed by Bliss, Annals of Appl. Biol., vol. 26, pages 585–615 (1939).

The effective dosage of copper chromates (based on the copper content) is low compared to standard copper fungicides. The fungicidal action of hexavalent chromium is greater than that of copper as measured by L. D. 95 values in greenhouse dosage response tests.

Potato field tests show that copper chromates control late blight at reasonable dosages.

The basic copper chromates may be used in physical mixture with other materials, for instance zinc chromates. In a field test on potatoes, basic copper chromate No. 3 was used in slurries containing, per 100 gallons of water, ½ pound of the copper chromate with 1½ pounds of zinc chromate No. 82. Copper-zinc chromate No. 29 having a copper-zinc ratio of 1 and copper-zinc chromate No. 27 having a copper-zinc ratio of 0.25 were tested in the field on potatoes as slurries containing 2 pounds of the chromate per 100 gallons of water. Both the mixtures of copper and zinc chromates and the copper-zinc chromates afforded good control of tip burn. The control was somewhat better in the case of the complex copper-zinc chromate but the control with the mixture of chromates shows that the control of tip burn by the zinc chromate is not adversely affected by the presence of the copper chromate which is used to control late blight.

The chromates may be prepared to include potassium, the effect of the alkali metal being to increase the chromate solubility. The alkali metals may thus be used to bring a chromate of too low a solubility into the proper solubility range but when the chromate solubility is increased to 0.03 the chromate is on the verge of being dangerously phytotoxic. Considering sodium and potassium as the alkali metals, potassium differs slightly from sodium in that the precipitated chromates tend to retain potassium better than sodium and when made with potassium usually retain more hexavalent chromium. The chromate solubility of potassium products is usually slightly higher than that of sodium products.

Data illustrating this feature are given in Table A with respect to chromates Nos. 19, 20 and 21.

The chromates may be prepared to include the alkaline earth metals, calcium, strontium, and barium. In considering the alkaline earths as a group, a distinction should be recognized between, for instance, calcium precipitated as a part of a complex metal chromate and calcium chromate per se. Calcium chromate as well as strontium chromate per se are to phytotoxic to be used safely but an alkaline earth may be used as a component of a complex multivalent metal chromate. The phytotoxic effect of the alkaline earth chromate is not avoided by using it in physical mixture with a heavy metal chromate. Barium chromate per se has too low a solubility to be of value as a fungicide.

Data on tests of chromates containing copper and an alkaline earth metal and, for comparison, alkaline earth chromates per se, are given in Table A with respect to chromates Nos. 12, 13, 14, 16, 49, and 157.

Barium chromate was not tested further than indicated on Table A for chromate No. 157 as its chromate solubility is so low that it is impractical. However, barium combined with copper so as to give a complex barium-copper chromate (No. 49) gave relatively good control of both late and early blight and the chromate gave a good weathering test.

Chromates containing calcium as a part of a complex chromate control tip burn. When tested in the field on potatoes against tip burn, calcium copper chromate No. 16 gave better control of tip burn than any other product tested including Bordeaux mixture (8-8-100). Calcium must be a part of the complex chromate for best control, as mixtures of basic copper chromate plus lime or limestone did not give satisfactory control. The slurry that was tested contained 4 pounds of the calcium-copper chromate per 100 gallons of water.

The chromates may contain a plurality of the multivalent metals, if desired. One of the metals may be considered as an addition to or as a substitute for a portion of, another metal. Thus, considering copper as the principal multivalent metal, the chromate may also contain one or both metals of the group zinc and cadmium.

Data from tests on chromates containing copper along with cadmium and/or zinc are given in Table A with respect to chromates Nos. 24 through 30, inclusive, and 34 through 40, inclusive.

Representative chromate No. 26 controlled apple scab very well with no phytotoxic effect on the foliage when used in sprays containing from 0.33 to 3 lbs. of the chromate per 100 gallons of water (see Table 4).

Zinc raises the insecticidal properties of the chromate. Representative chromate No. 27 gave good control of Colorado potato beetle larvae in field tests, potato plants treated with a spray containing this chromate (4 lbs. chromate per 100 gallons of water) showing 98 larvae as against untreated plants which showed 422 larvae. In other field tests this chromate also gave good control of potato leaf hopper, potato plants treated with the same spray showing a mean of 15.3 leaflets injured by the hopper as against a mean of 98.9 injured leaflets for untreated plants.

Copper-zinc chromate No. 29 having a copper to zinc ratio of 1, tested in a slurry at 2 lbs. per 100 gallons of water, gave good control of tip or hopper burn in field tests on potatoes as did copper zinc chromate No. 27 having a copper to zinc ratio of 0.25. Better control was obtained when the two metals were precipitated together in a complex chromate than where mixtures of chromates of the respective metals were used. In the field test on potatoes with chromate No. 27, late blight was a factor. Untreated check plants yielded at the rate of 297 bushels per acre, those treated with Bordeaux mixture (8-6-100) yielded at 345 bushels, and those treated with chromate No. 27 (5 lbs. per 100 gallons of water) yielded at 370 bushels per acre.

The weathering tests on copper-zinc chromates show that these chromates ar substantially as effective as copper chromates. This is true even though other toxic elements are also present. Thus, where it is desirable to have zinc present for some reason other than late blight control, for instance for tip burn control, the presence of the zinc does not adversely affect the control of late blight by the copper and chromium in a complex chromate.

Copper-cadmium chromates have high toxicity, higher even than cadmium chromates.

The inclusion of cadmium in the chromate raises the fungicidal characteristic of the chromate toward late blight and also increases the control of tip burn. Since a lower dosage is required to give fungicidal control, any slight phytotoxic effect will be reduced and if reduced below the amount required for threshold phytotoxicity, any phytotoxic effect will entirely be eliminated. The cadmium thus, in effect, lowers the phytotoxicity of the chromate.

With cadmium present there is synergism with respect to the control of late blight since the average late blight control for the chromates containing both copper and cadmium is better than for copper only or for cadmium only, according to greenhouse tests. Also copper-cadmium chromates show very slight reduction in toxicity due to weathering and they have a good weathering rating.

Potato field tests show that copper-cadmium chromates control both late blight and tip burn. In a field test on potatoes, copper-cadmium chromate No. 34 controlled both late blight and tip burn as well as Bordeaux mixture (8-8-100). The chromate spray contained 2 lbs. of the chromate per 100 gallons of water. The plants in the respective plots were given the same number of sprayings at the same times. No evidence of phytotoxic injury was observed on the plants treated with the chromate spray. Slurries containing as little as 0.25 lb. of chromate No. 34 per 100 gallons (about 1.3 oz. based on cadmium chromate content) gave some control of tip burn as did a mixture of copper chromates No. 3 and No. 34 (about 0.67 oz. based on cadmium chromate content).

Copper-cadmium chromate No. 38, at 1 lb. per 100 gallons containing an equivalent of only 1.75 oz. of basic cadmium chromate per 100 gallons of spray was quite effective in controlling tip burn in field tests.

With cadmium present there is also synergism with respect to the control of insects as is indicated by comparing the insecticide ratings of the cadmium-copper chromates in Table A with those of the copper chromates and the cadmium chromates.

Considering copper as the principal heavy metal, the chromate may also contain one or more metals of the group iron, cobalt and nickel. Data from tests on chromates containing copper, iron, cobalt and nickel are given in Table A with respect to chromates Nos. 58 to 67, inclusive, and 72 to 76, inclusive.

The advantage of iron is that it can economically be used to replace part of the copper thus permitting a higher chromate-to-copper ratio than is possible with a simple basic copper chromate, as shown by chromates Nos. 72 and 73.

With nickel present there is consistently low phytotoxicity and consistently good results in weathering tests.

Cobalt improves the insecticidal action of the chromate with respect to all four insects studied in the laboratory as seen in Table A with respect to chromates Nos. 58 and 60. Chromates Nos. 61 and 59 contain progressively lower proportions of cobalt, so the insecticidal action is correspondingly less.

Considering copper as the principal multivalent metal, the chromate may contain one or more metals selected from the earth metals, aluminum and the rare earths, represented by aluminum and cerium.

Data from tests on chromates containing aluminum and cerium are given in Table A with respect to chromates Nos. 44, 45, 46, 47, 68, and 69.

Representative chromate No. 44 controlled apple scab very well in field tests with only possibly slight phytotoxic effect on the foliage, when used in sprays containing from 0.33 to 3 lbs. of the chromate per 100 gallons of water (see Table 4).

Representative chromate No. 68 gave excellent control of Colorado potato beetle larvae in field tests, potato plants treated with a spray containing this chromate (4 lbs. of the chromate per 100 gallons of water) showing 7 larvae as against untreated plants which showed 422 larvae. In other field tests this chromate also gave good control of potato leaf hopper, potato plants treated with the same spray showing a mean of 21.2 leaflets injured by the hopper as against a mean of 98.9 injured leaflets for untreated plants.

The chromates containing aluminum also afforded good control of cankerworm.

Considering copper as the principal multivalent metal, the chromate may contain chromium as another multivalent metal. The chromium which is the multivalent metal is trivalent as distinguished from hexavalent chromium in the chromate radical.

Data from tests on a chromate containing chromium and copper as multivalent metals are given in Table A with respect to chromate No. 43. This chromate shows good control of late blight.

Considering copper as the principal multivalent metal, the chromate may contain silver and mercury as other metals.

Data from tests on complex chromates containing silver and mercury are given in Table A with respect to chromates Nos. 56 and 57. Both chromates gave very good control of late blight, particularly under the weathering test. The chromate containing mercury also gave very good general insect control and, although this chromate is rather costly due to the mercury content, it is suitable for use on ornamental plants where cost is of less consideration than fungus and insect control.

Considering copper as the principal multivalent metal, the chromate may contain arsenic as another metal. The two metals afford a relatively low cost insecticide-fungicide control, giving very good control of cankerworm, potato leaf hopper, Colorado potato beetle, late and early blight, with low phytotoxicity. Fair control of Japanese beetle was also found.

Data from tests on a chromate containing arsenic are given in Table A with respect to chromates Nos. 70 and 71. The arsenic used is pentavalent and appears in the anion of the chromate; it is always used with another multivalent metal.

Arsenic raises the insecticidal properties of the chromate. Representative chromate No. 70 gave excellent control of Colorado potato beetle larvae in field tests, potato plants treated with a spray containing this chromate (4 pounds of the chromate per 100 gallons of water) showing 29 larvae as against untreated plants which showed 422 larvae. In other field tests this chromate also gave good control of potato leaf hopper, potato plants treated with the same spray showing a mean of 22.7 leaflets injured by the hopper as against a mean of 98.9 injured leaflets for untreated plants.

Considering copper as the principal multivalent metal, the chromate may contain the metals lead and uranium. The complex copper chromates containing either of these metals exhibited low phytotoxicity and the copper-lead chromate gave fairly good control of cankerworm.

Data from tests on complex copper chromates containing lead and uranium are given in Table A with respect to chromates Nos. 41, 42, and 48.

If desired, nonmetallic groups may be used with, or as a substitute for a portion of, the multivalent metal. Thus the chromates may contain nitrogenous groups and organic groups, for instance ammonia or basic organic radicals.

Data from tests of such chromates are given in Table A with respect to chromates Nos. 23, 77, 80, 140, 144, 145, 146, and 149.

The ammonium-copper chromate No. 23 gave good control of both late and early blight and had a low phytotoxicity combined with good weathering characteristics.

While the foliage of the majority of plants is resistant to the particular phytotoxic effect of copper, the foliage of certain specific plants, for instance apple and cherry are undesirably affected by treating materials containing copper. For spraying apple and cherry trees in foliage, non-copper or predominantly non-copper chromates are preferred, for instance zinc chromates. For controlling tip burn, zinc chromates may be used at reasonable doses either alone or in admixture with copper chromates or the zinc may be substituted for a portion of the copper, to give a copper-zinc chromate.

The most simple basic chromates containing zinc are represented, on Table A, by the chromates Nos. 81 to 86, inclusive.

The simple basic zinc chromates, as a class, have quite low phytotoxic characteristics, give fairly good blight tests, and relatively good control of cankerworm, Colorado potato beetle larvae, potato leaf hopper, and Mexican bean bettle. Moreover, basic zinc chromates are not specifically toxic to apple, peach, and cherry and may thus freely be used on these plants where copper chromates cannot so be used.

Representative chromate No. 82 controlled apple scab very well with no phytotoxic effect on the foliage when used in sprays containing from 0.33 to 3 lbs. of the chromate per 100 gallons of water (see Table 4).

A field test on cherry trees, like the apple tree field test, showed that the non-copper chromates are excellent fungicides without being phytotoxic to these copper-sensitive plants. For the test young cherry trees were treated to control cherry leaf spot. The test consisted of six treatments with seven replicates. A slurry was made from 1 lb. of chromate No. 82 per 100 gallons of water and another slurry from 2 lbs. of blue vitriol and 6 lbs. of hydrated lime in 100 gallons of water to make Bordeaux mixture 2–6–100. This dosage of Bordeaux was chosen because it is a standard spray for cherry leaf spot selected to obtain a compromise between disease control and phytotoxicity. The trees were sprayed 3 times during the season; near the first of June, the last of June, and the middle of July. The disease had obtained a start before the first spraying. The percent of leaves remaining on the tree toward the end of August are shown in the following table.

TABLE 6

| Identification No. | Type of Fungicide | Per Cent Leaves Remaining | Phytotoxicity |
|---|---|---|---|
| | Check (no spray) | 46.9 | |
| | Bordeaux (2-6-100) | 60.4 | Injury. |
| 82 | Zinc chromate | 75.5 | No injury. |
| 89 | Zinc-cerium chromate | 88.1 | Do. |
| 116 | Aluminum chromate | 62.2 | Do. |

Representative chromates Nos. 81 and 82 gave very good control of Colorado potato beetle larvae in field tests, plants treated with sprays containing these chromates (4 lbs. of the chromate per 100 gallons of water) showing 40 and 42 larvae, respectively, as against untreated plants which showed 422 larvae. In other field tests these chromates also gave good control of potato leaf hopper, potato plants treated with the same spray showing means of 20.5 and 16.0 respectively, leaflets injured by the hopper as against a mean of 98.9 injured leaflets for untreated plants. In still other field tests the same sprays of these chromates afforded a control (estimated by trained observers) of Mexican bean beetle on bushbean plants equivalent to treatment by a standard dust composed of rotenone 0.75% (by weight), cube resins 1.80%, dusting sulfur 30.00%, and pyrophyllite 68.45%, the estimated degree of beetle damage being only a trace in each instance as against heavy damage to untreated plants.

Other potato field tests show that zinc chromates control tip burn at reasonable dosages. In one field test, a slurry containing 2 lbs. of zinc-tetroxy chromate No. 81 gave control of tip burn comparable with Bordeaux mixture (8–8–100). In another field test, slurries containing, per 100 gallons of water, 1 and 3 lbs. respectively of chromate No. 82 used alone, and 1½ lbs. of chromate No. 82 used in conjunction with ½ lb. of chromate No. 3, gave good control of tip burn. The tip burn control was better the higher the dosage of zinc chromate. Copper-zinc chromate No. 29 having a copper-to-zinc ratio of 1, tested in a slurry at 2 lbs. of the chromate per 100 gallons of water, gave good control of tip burn in field tests on potatoes as did copper-zinc chromate No. 27, having a copper-to-zinc ratio of 0.25. The control of tip burn with the mixture of zinc chromate and copper chromate shows that the control of tip burn by the zinc chromate is not adversely affected by the presence of the copper chromate which is used to control late blight. However, better control was obtained where the two metals were precipitated together in a complex chromate than where mixtures of chromates were used.

In a field test on potatoes under conditions where late blight was not a major factor, Bordeaux (8–4–100) injured the plants, actually reducing the yield below that of the untreated check plants, but chromate No. 30 applied at the rate of 3 pounds per 100 gallons of water had no phytotoxic effect. The plants treated with the chromate yielded 99 pounds of potatoes per row as against 94 pounds for untreated plants and 81 pounds for the Bordeaux mixture. As late blight was not a major factor, the tests indicated the phytotoxic effect of the materials.

Laboratory fungicide tests show that zinc chromates are more effective than would be predicted from the toxicity of other zinc compounds and chromates containing no other toxic metal. The zinc chromates are synergistic, having a toxic effect greater than additive.

A calculation similar to that made for copper chromates and previously explained, was made for zinc chromates containing no other metal toxic to fungi. The inherent toxicity of zinc (expressed as ZnO) was found, from testing soluble zinc salts, to be .055, or L. D. $50_{ZnO}=18.23$. Using the same procedure as previously explained with respect to copper chromates, the experimental and calculated L. D. $50_T$ for each of the zinc chromates Nos. 81, 82, 100, 101, and 102 was obtained and averaged geometrically. The results are as follows:

| | Average, L. D. $50_T$ | $\frac{1}{\text{L. D. } 50_T}$ = joint toxicity |
|---|---|---|
| Calculated | 1.23 | .81 |
| Experimental | .46 | 2.17 |

For zinc chromates as well as copper chromates the toxicity is greater than additive, and synergism is manifested.

Iron, cobalt and nickel may be used in complex chromates with zinc as well as with copper and other multivalent metals. Data with respect to several such chromates is given in Table A for chromates Nos. 92, 93, 100, and 101. These chromates have low phytotoxicity and those containing iron and nickel afforded good control of Colorado potato beetle. An advantage of iron is its low cost.

Representative chromate No. 100 controlled apple scab very well with no phytotoxic effect on the foliage when used in sprays containing from 0.33 to 3 pounds of the chromate per 100 gallons of water (see Table 4).

Cerium may be used with zinc as well as with copper and other multivalent metals. Data from tests on chromates containing zinc and cerium are given in Table A with respect to chromates Nos. 88 and 89. The chromates have low phytotoxicity characteristics.

Representative chromate No. 89 controlled apple scab very well with no phytotoxic effect on the foliage when used in sprays containing from 0.33 to 3 pounds of the chromate per 100 gallons of water (see Table 4).

Zinc-cerium chromates contemplated herein effectively control cherry leaf spot. A slurry made from 1 pound of chromate No. 89 in 100 gallons of water, tested on cherry trees as stated in connection with Table 6, did not injure the foliage and the treated trees showed 88.1% of leaves remaining.

Arsenic may be used with zinc as well as with the other multivalent metals. Data from tests on chromates containing zinc and arsenic are given in Table A with respect to chromates Nos. 90 and 91.

Representative chromate No. 91 controlled apple scab very well with no phytotoxic effect on the foliage when used in sprays containing from 0.33 to 3 lbs. of the chromate per 100 gallons of water (see Table 4).

Complex chromates containing lead and another multivalent metal have been prepared and tested. Data for a chromate containing lead and zinc are given on Table A with respect to chromate No. 94. The chromate had low phytotoxicity, gave moderate control of both late and early blight, and afforded about the same control on weathering. This chromate was prepared and tested to show that the failure of lead chromate (compared chromate No. 156) is not due to the presence of the lead but rather to the low chromate solubility of lead chromate. On the other hand a complex chromate containing lead and a multivalent metal such that the chromate solubility is within the range given, is effective.

Basic complex chromates containing barium and another multivalent metal have been prepared and tested. Data for a chromate containing barium and zinc are given on Table A with respect to chromate No. 95. Barium is quite similar to lead with respect to low phytotoxicity and weathering. Upon comparing barium-zinc chromate No. 95 with barium chromate No. 157 it will be seen that the failure of barium chromate is, like lead chromate, not due to the presence of the barium but rather to the low chromate solubility.

Representative chromate No. 96 controlled apple scab very well with no phytotoxic effect on the foliage when used in sprays containing from 0.33 to 3 pounds of the chromate per 100 gallons of water (see Table 4). This type of complex chromate, containing a relatively expensive metal such as silver, is adapted for use by the householder on ornamental plants because of its toxicity and good weathering.

Complex chromates containing mercury gave low phytotoxicity combined with good weathering and good general control of insects. Data from tests on a chromate containing zinc and mercury are given in Table A with respect to chromate No. 97. This type of chromate is particularly adapted for use by the householder on ornamental plants because of its good weathering and its characteristic of inhibiting both fungi and insects.

Trivalent chromium may be used as a multivalent metal with zinc as well as other metals. Data from tests on chromates containing zinc and trivalent chromium are given in Table A with respect to chromates Nos. 102 and 103. These chromates had generally low phytotoxicity and gave relatively good control of early blight.

Representative chromate No. 102 controlled apple scab very well with no phytotoxic effect on the foliage when used in sprays containing from 0.33 to 3 pounds of the chromate per 100 gallons of water (see Table 4).

Cadmium has relatively high toxicity and relatively low phytotoxicity when used in chromates. Data from tests on chromates containing cadmium alone or with an alkali metal are given in Table A with respect to chromates Nos. 107 and 108. From these data, it will be seen that chromates containing cadmium as the only multivalent metal are quite effective in controlling late blight and have low phytotoxicity.

Because of the high cost of cadmium, chromates containing this metal are considered primarily as complex chromates where the cadmium is used in conjunction with a cheaper metal or where the cadmium is used in a small proportion to other toxic metal in the chromates to broaden the toxicity range.

Thus cadmium may be used in the chromate in conjunction with other metals, for instance iron and cerium. Data from tests on chromates containing these metals in conjunction with cadmium are given in Table A with respect to chromates Nos. 109 and 110.

Representative chromate No. 109 controlled apple scab very well with only slight phytotoxic effect when the spray contained the highest amount of the chromate and with no phytotoxic effect at the two lower dosages (see Table 4).

A plurality of metals, for instance cadmium and zinc, may be used together as the multivalent metals of the chromate. Data from tests on such a combination of metals are given in Table A with respect to chromate No. 87. This chromate gave relatively good control of both late and early blight, cankerworm and Colorado potato beetle, and had low phytotoxicity.

Any number of multivalent metals may be used in the chromate as is indicated by chromate No. 110 containing the metals cadmium, iron and cerium, and chromate No. 103 containing zinc, manganese and trivalent chromium; but the chromate solubility must not be too high or the chromate will be too generally phytotoxic as is indicated by chromates Nos. 98, 99, and 106. Data from tests with respect to these chromates are given in Table A.

Other chromates containing cadmium and referred to in Table A are Nos. 34 to 40, inclusive.

Aluminum and beryllium are representative of the lighter weight multivalent metals which may be used in the chromates; either may be used as the sole multivalent metal or in conjunction with other metals. In general, the simple basic aluminum chromates are characterized by relatively low phytotoxicity where the chromate solubility is not too high. Such phytotoxicity as may be attributable to the aluminum per se may be overcome, if objectionable, by the use of combined calcium. Data from tests on chromates containing aluminum as the sole multivalent metal are given in Table A with respect to chromates Nos. 112 to 115, inclusive. From a comparison of the foregoing chromates with chromate No. 116, the safening action of calcium in the chromate will be seen. Data with respect to a typical beryllium chromate are given in Table A with respect to chromate No. 160.

Data in Table A from tests on chromates Nos. 117 and 123 indicate, respectively, the phytotoxicity of a chromate having too high a chromate solubility and the ineffectiveness of a chromate having too low a chromate solubility.

Representative chromate No. 115 controlled apple scab very well with only possibly slight phytotoxic effect on the foliage and representative chromate No. 116 controlled the scab with no phytotoxic effect when used in sprays containing from 0.33 to 3 lbs. of the respective chromate per 100 gallons of water, again confirming the safening effect of calcium on the metal in a complex chromate (see Table 4).

Aluminum chromates contemplated herein effective control cherry leaf spot. A slurry made from 1 lb. of chromate No. 116 in 100 gallons of water, tested on cherry trees as stated in connection with Table 6, did not injure the foliage and the treated trees showed 62.2% of leaves remaining.

Data with respect to aluminum chromates containing various other metals are given in Table A with respect to chromates Nos. 118 to 122, inclusive, all of which are characterized by low phytotoxicity, as well as chromates Nos. 44 to 47, inclusive.

The rare earth metals, cerium being representative, may be used as the sole multivalent metal of the chromate or they may be used in conjunction with other metals. Data from tests on chromates containing cerium are given in Table A with respect to chromates Nos. 124, 125, and 126, as well as chromates Nos. 68, 69, 88, 89, 110, and 118, showing the generally low phytotoxicity of the cerium chromates.

Representative chromate No. 126 controlled apple scab very well with no phytotoxic effect on the foliage when used in sprays containing from 0.33 to 3 lbs. of the chromate per 100 gallons of water (see Table 4).

Iron may be used as the sole multivalent metal of the chromate or it may be used in conjunction with other metals. Data from tests on chromates containing iron and various other metals and non-metal groups are given in Table A with respect to chromates Nos. 72 to 76, inclusive, 100, 101, 109, 110, 127, 128, 129, 131, 136, 138, 144, and 158.

A comparison of the phytotoxicity rating of chromates Nos. 127 and 128 shows again the safening action of calcium in the chromate.

Trivalent chromium may be used as the sole multivalent metal of the chromate or it may be used in conjunction with other metals or with non-metal groups. Data from tests on chromates containing trivalent chromium and various other metals and non-metal groups are given in Table A with respect to chromates Nos. 146, 147, 149, 151, and 152, as well as chromates Nos. 43, 102, 103, 125, 131, 144, and 148. These chromates, in general, have low phytotoxic action. Chromate No. 146 represents chromates containing high molecular weight organic and nitrogenous and thio groups.

Representative chromates Nos. 146 and 147 controlled apple scab very well with no phytotoxic effect on the foliage when used in sprays containing from 0.33 to 3 pounds of the chromate per 100 gallons of water (see Table 4).

Cobalt and nickel may be used as the sole multivalent metal of the chromate or they may be used in conjunction with other metals. Data from tests on chromates containing cobalt and nickel are given in Table A with respect to chromates Nos. 153, 154, and 155, as well as chromates Nos. 58 to 67, inclusive, 92, and 93. The cobalt chromates exhibited good insecticidal characteristics on cankerworms and Colorado potato beetles. Both chromates had relatively low phytotoxic action.

Uranium may be used as the sole multivalent metal in the chromate or in conjunction with another metal. Data from tests on such chromates are given in Table A with respect to chromates Nos. 41 and 42 (with copper) and 158 (with iron).

Because of the high cost of uranium, chromates containing this metal are considered primarily as complex chromates where the uranium is used in conjunction with a cheaper metal or where the uranium is used in a small proportion to other toxic metal in the chromates to broaden the toxicity range.

Because of the phytotoxicity of silver, this metal may be used only in conjunction with a multivalent metal. Data from tests on complex chromates containing silver are given in Table A with respect to chromates Nos. 56, 96, and 122, showing good results in weathering tests and good control of both late and early blight. The complex basic chromates of silver and a multivalent metal were found to have lower phytotoxicity than $Ag_2CrO_4$ and thus the multivalent metal may be considered a safening component for silver phytotoxicity.

Mercuric mercury may be used as the sole multivalent metal of the chromate or mercury may be used in conjunction with other metals. Data from tests on chromates containing mercury are given in Table A with respect to chromates Nos. 57, 97, 111, and 121. All of these chromates inhibit fungi quite well, have relatively low phytotoxicity, and those tested against insects have relatively good insecticidal characteristics.

Thorium may be used as the multivalent metal of the chromate. Data from a test on such a chromate is given on Table A with respect to chromate No. 161.

If desired, non-metallic groups may be used with, or as a substitute for a portion of, the multivalent metal or as a substtiute for a portion of the chromate radical. Thus the chromates may contain nitrogenous groups, thio groups, and organic groups. The nitrogenous groups include ammonia, amines, imides, and cyclic compounds containing nitrogen and nitro compounds, in fact any organic compound having a basic reaction where the organic radical is capable of substitution for a part of the multivalent metal or having an acidic reaction where the organic radical is capable of substitution for a part of the chromate radical. The thio groups include basic and acidic ring and chain compounds containing sulfur. The organic groups may be saturated or unsaturated, cyclic or acyclic, carbocyclic or heterocyclic and may contain other substituents, for instance as metals, in metal organic compounds or the nitrogen or sulfur aforesaid.

Data from tests of typical chromates are given in Table A with respect to chromates Nos. 23, 77, 78, 79, 80, 104, 105, 144, 145, 146, and 149. The ammonium-copper chromate No. 23 gave good control of both late and early blight and a low phytotoxicity combined with good weathering characteristics. The nitro-aromatic compounds 78, 79, 104, and 105 showed no phytotoxicity on tomato as contrasted with the known phytotoxicity of the nitro-aromatic compounds when used alone as insecticides. These materials are examples of complex chromates containing an insecticidal component. Chromates Nos. 78 and 79 rated B and chromate No. 104 rated A in insecticide tests on Mexican bean beetle larvae tested on bean plants, var. Tendergreen. The test method and ratings were as explained for cankerworm. In a field test on string beans against leaf hopper nymphs, untreated plants averaged 35.4 nymphs per 20 leaves while plants treated with aqueous sprays of chromate No. 105 (4 pounds per 100 gallons) averaged only 4.3 nymphs per 20 leaves. The count was made 72 hours after spraying the plants.

Of the chromates disclosed herein, those containing, in the positive ion, two or more multivalent metals, those containing a heavy metal and a safening metal, and those containing a heavy metal and an organic group are, in general, believed to be new materials, particularly where their chromate solubilities lie between .0001 and .03.

The metal chromates contemplated herein may be applied in any suitable manner. They are all solids and non-volatile at temperatures up to at least 60° C. and are to be distinguished from volatile materials containing chromium which are used as fumigants. In cases where the reactants which produce the chromates are phytotoxic, the chromates are formed before they are applied to the plants, that is the chromates are applied to the plants as chromates; the reactants which produce the chromates are not applied with the idea that the chromates will be formed in situ, as the reactants will usually attack the plant. However, this does not preclude the possibility that the chromates after application to the foliage may change somewhat in composition over a period of time as a result of weathering.

The chromates may conveniently be applied as a slurry or suspension; for instance, the suspensions may be sprayed on trees, plants and the like, a 1% (by weight) aqueous suspension being sprayed on commercially planted potatoes at the rate of about 100–125 gallons per acre, and on other plants in proportion to give the necessary coverage. The chromates may also be applied to plants in foliage as a dust from flying machines or from the usual dusting machines with or without materials added for some purpose such as to increase tenacity or merely for extending purposes. However, a feature of the invention is that the chromates contemplated herein generally remain in place on the plant very well without the use of added "stickers" to promote adhesion. Adhesives may, however, be used, particularly with the chromates which are the least resistant to weathering. When dusting on plants, the dusting composition preferably comprises a very large proportion of cheap added material, for instance talcs or clays, acting as diluents or extenders, as the chromates are so effective that an exceedingly small amount is required on any area for inhibitive purposes. Bentonite is a combined extender and adhesive but any other suitable extender or adhesive or combined adhesive and extender may be used. Suitable dusts to be used in the usual dusting machines may carry as little as 1 part by weight of the chromate in 100 parts of dusting composition, but the chromates may be used without diluents. To determine whether the chromates contemplated herein could be applied as a dust as well as a slurry, and the effect of applying the chromates as dusts, a series of representative chromates was dusted on tomato plants. No diluent was used. Some of the plants were then infested with late blight and others with early blight (procedure previously described). After a few days in the greenhouse the percent disease relative to untreated plants was recorded. A phytotoxicity rating was made in the described manner at the same time. The results are recorded below:

Chromate No. 164 illustrates that chromates with high solubilities are phytotoxic when applied as a dust as well as when applied as a slurry.

A feature of the invention is that one of the metals combined with the chromium in the chromate may be a metal which is highly poisonous to insects, for instance arsenic. Chromates of this type are toxic to both fungi and insects. However, although the chromates are preferably the dominant toxic or inhibiting agent in the composition, insecticides (both of the killing and of the repelling types) may be used with the chromates, as well as adhesives, diluents or extenders and adjuvants. These added materials may, in general, be referred to as "addends." They should not be used in amounts which make the fungicidal composition phytotoxic, they are preferably nonphytotoxic in themselves and they are preferably non-reactive with the chromates at least to such an extent, nor, if phytotoxic are they used to such an extent, as to make the composition phytotoxic or to destroy the fungicidal action of the chromate as by reducing the hexavalent chromium below the lower limits of chromate solubility. The chromates contemplated herein are substantially neutral from a chemical point of view with respect to the addends, at least in the concentrations and under the conditions desirable for the purposes of phytotoxicity and inhibitive action. Insecticides may be made by combining in the chromate a metal or an organic radical of a suitable type, for instance a nitro-aromatic radical such as those previously described. If desired, known materials, for instance the various nicotine materials or pyrethrum, rotenone, "DDT," calcium arsenate, lead arsenate or sulfur, which are either toxicants or repellents for insects (the sulfur also being a fungicide), may be used in conjunction with the chromates. Thus in insecticidal compositions comprising the chromates and the addends, the chromates exert their own killing or repellent or inhibitive characteristics and they assist (or they may be assisted by) compatible addends in exerting the desired effects.

Field tests on potatoes show that DDT and calcium arsenate in standard insecticidal doses, when combined with the chromates contemplated herein, give the full insecticidal control, as indicated in the following table:

TABLE 7

| Identification No. | Multivalent Metals | Per Cent Disease | | Phytotoxic Rating |
|---|---|---|---|---|
| | | Late Blight | Early Blight | |
| 18 | Mg-Cu | 0 | 3.3 | 0 |
| 27 | Zn-Cu | 1.8 | 7.1 | 0 |
| 34 | Cd-Cu | | 5.5 | 1− |
| 56 | Cu-Ag | 3.1 | | 0 |
| 70 | Cu-As | 9.2 | .9 | 1 |
| 80 | Cu | 26 | 15 | 0 |
| 82 | Zn | 0 | 5.0 | 1− |
| 91 | Zn-As | 2.8 | | 1− |
| 96 | Zn-Ag | 0 | 4.4 | 1 |
| 104 | Zn | 4.9 | 27 | 0 |
| 105 | Zn | 1.2 | 5.1 | 0 |
| 115 | Al | 2.8 | 11 | 1 |
| 126 | Ce | 3.8 | 1.3 | 1 |
| 154 | Ni | 0 | 4.8 | 1 |
| 160 | Be | | 15 | 0 |
| 164 | Ca | | | 3+ |

TABLE 8

| Identification No. | Lbs. per 100 Gallons | | | Per Cent Injury Relative to Untreated Check Plants | |
|---|---|---|---|---|---|
| | Chromate | DDT | Calcium Arsenate | Tip Burn Due to Leaf Hopper | Flea Beetle |
| 16 | 4 | .5 | | 7 | 19 |
| 27 | 3 | .5 | | 8 | 29 |
| 33 | 7 | | 4.0 | 23 | 15.5 |

Thus the chromates contemplated herein do not interfere with the insecticidal action of the insecticides. Estimates of late blight infectations show that the chromates control late blight when applied along with either DDT or calcium arsenate. The insecticides alone did not control the fungus.

Greenhouse disease tests were made in the manner previously described to determine the percent disease on tomatoes relative to unsprayed plants following a 0.2% spray of the chromate with and without other spray materials added. The results are as follows:

TABLE 9

| Identification No. | No Added Ingredient | | 1 Part Nicotine Sulfate in 800 Parts of Spray, by Volume | | 0.5% Wettable Sulfur per 100% of Spray, by Weight | |
|---|---|---|---|---|---|---|
| | L. B. | E. B. | L. B. | E. B. | L. B. | E. B. |
| 16 | 2.6 | 3.5 | .9 | 2.7 | 2.2 | 1.5 |
| 27 | 8.9 | 7.4 | 4.4 | 3.5 | 5.8 | 3.8 |
| 33 | 1.4 | 6.1 | 2.5 | 2.3 | .4 | 3.8 |
| Additive alone | | | 100 | 100 | 24.0 | 44.0 |

NOTE: L. B.=late blight; E. B.=early blight.

Other greenhouse tests made as previously described have shown that lead arsenate does not interfere with the fungicidal action of chromates Nos. 16 and 33. The results are shown below:

TABLE 10

| Identification No. | Dosage (per cent) | | Per Cent Disease | | Chromate Solubility with Lead Arsenate Present |
|---|---|---|---|---|---|
| | Chromate | Lead Arsenate | L. B. | E. B. | |
| 16 | .2 | 1.0 | 6.1 | 1.8 | .0008 |
| 33 | .2 | 1.0 | 5.4 | 4.4 | .0009 |

NOTE: L. B.=late blight; E. B.=early blight.

In determining the chromate solubility, 1 gram of the chromate mixed with 5 grams of the arsenate was used per 100 cc. of water.

The chromates, being solids, assist in holding on the plant such addends as may be liquids or may be vaporizable whereby the compositions or their vapors thoroughly contact or can attack or repel the adult insects or their earlier forms. The composition applied to the plant may also include another fungicidal agent, for instance tetramethyl thiuram disulfide or the sulfur of Table 9. In these cases, depending upon the character and amount of the addend, the amount of chromate may be decreased but it is preferred that the chromate be the dominant toxic or inhibitive agent.

In the matter of addends which are adjuvants and adhesives, these are of the type which cause the chromates to adhere to the plant and prevent the loss of the chromates from the treated host, for instance loss due to wash-off by rain, blowing off by wind and the like. Suitable adjuvants of the type preventing loss of fungicide are talcs, clays, pyrophillite, bentonite and the like. These materials are water-insoluble adhesive agents and are nonphytotoxic.

In the matter of additive materials, the chromate spray composition is preferably free or substantially free of materials which retain the chromates to such an extent that a chromate solubility above the lower limit cannot be obtained, or materials which make the spray difficult to apply or materials which readily reduce hexavalent chromium.

The spray compositions used should avoid concentrations of other materials which would be phytotoxic, particularly materials such as soluble chlorides, nitrates and other metal salts which have phytotoxic effects with little or no fungicidal effect.

It is particularly advisable to avoid including phytotoxic deliquescent agents, such as calcium chloride, in the composition applied to the plant, since by absorbing moisture these form a very concentrated solution which is phytotoxic. A 1% aqueous solution of $CaCl_2$ gave a phytotoxic rating of 2 in the buckwheat, bushbean and tobacco phytotoxicity tests previously described. A material with such a phytotoxic rating is considered to be too harmful for practical use as a foliage fungicide.

The data disclosed herein indicate that for plants which are representative of the majority of plant species of actual or potential economic interest, chromates inhibit fungi as do certain other elements, such as copper, silver and mercury; but the latter three metals are known to be quite phytotoxic to at least some economic plants, while the basic chromates contemplated herein are not as long as the solubility restrictions are followed. The presence of the toxic elements in the chromates may make the fungicide phytotoxic under conditions where the added toxic ingredient is itself phytotoxic but the fact that the chromate radical is fungicidal if the chromate solubility of the chromate is above .0001 and is not too phytotoxic if the chromate solubility of the chromate is below .03, allows the use of such relatively small amounts of the phytotoxic metal in the positive ion of the chromate that even with the phytotoxic metal present in the chromate, the chromate of the phytotoxic metal can be of relatively high fungicidal value and yet relatively nonphytotoxic. With chromates showing a chromate solubility between .0001 and .006, there is little or no danger of injury to the plant due to the phytotoxic effect of the chromate radical. Also, since certain of the multivalent metals have relatively specific phytotoxicities (copper, for instance, being relatively phytotoxic to apple and cherry, and nonphytotoxic to tomato and potato), fungicides of high fungicidal characteristics and of low phytotoxic characteristics for specific plants may be prepared from chromates in which the multivalent metal of specific phytotoxicity is replaced in whole or in part by a multivalent metal of specific nonphytotoxicity (copper, for instance, being replaced in whole or in part by zinc in a chromate for use on apple and cherry) to give a fungicide of high fungicidal characteristics and low phytotoxic characteristics on any given plant. Thus, unless a particular species of plant is susceptible of injury due to the particular multivalent metal used, as apple is susceptible of injury by copper, basic chromates which show chromate solubilities within the limits given may safely be used with good results. Also, even in the case where the multivalent metal is the cause of plant injury, the injury may be lessened while the fungicidal effect is maintained, by using a chromate showing chromate solubilities within the limits given.

The invention is susceptible of modification within the scope of the appended claims.

TABLE A

| No. | Formula | Suspension pH | Chromate Solubility 1% Susp. | Slide Germination Tests |||||||| 
|---|---|---|---|---|---|---|---|---|---|---|---|
| | | | | S. f. || A. s. || G. c. || M. s. ||
| | | | | LD-50 | LD-95 | LD-50 | LD-95 | LD-50 | LD-95 | LD-50 | LD-95 |
| 1 | 8CuO·3CrO₃·6H₂O | 6.2 | .004 | 2.1 | 3.2 | .9 | 1.5 | 1.6 | 6.3 | 1.6 | 6.2 |
| 2 | 4CuO·CrO₃·3H₂O | 5.5 | .0004 | 1.9 | 3.0 | .43 | .63 | .61 | .85 | .26 | .84 |
| 3 | 3CuO·CrO₃·3H₂O | 7.0 | .0005 | 1.04 | 2.0 | .51 | .70 | .28 | 1.0 | 1.12 | 1.6 |
| 4 | 7CuO·2CrO₃·6H₂O | 7.0 | .0008 | .166 | 3.0 | .55 | .8 | .49 | 2.0 | 1.04 | 2.0 |
| 5 | 6CuO·2CrO₃·5H₂O | 5.8 | .0004 | .2 | .3 | 1.8 | 2.5 | 1.4 | 2.1 | 1.9 | 3.2 |
| 6 | 5CuO·CrO₃·4H₂O | 7.1 | .0001 | .8 | 1.1 | 1.7 | 2.5 | | | | |
| 7 | 6CuO·2CrO₃·5H₂O | 5.4 | .0002 | .9 | 1.3 | 2.2 | 2.6 | .3 | .7 | .4 | .8 |
| 8 | 6CuO·2CrO₃·5H₂O | 6.1 | .0002 | 2.4 | 3.6 | 1.0 | 1.3 | | | | |
| 9 | 12CuO·3CrO₃·SO₃·8H₂O | 7.3 | .00015 | 1.4 | 2.5 | .5 | .7 | | | | |
| 10 | 3CuO·CrO₃·3H₂O+some NH₃ | 5.8 | .0265 | 1.76 | 2.20 | 1.49 | 2.07 | .38 | .52 | 3.52 | 4.39 |
| 11 | 6CuO·2CrO₃·5H₂O | 5.5 | .0086 | 3.49 | 4.34 | 3.17 | 4.26 | .72 | 1.03 | 1.75 | 2.19 |
| 12 | 5CaO·7CuO·2CrO₃·4SO₃·6H₂O | 10.6 | .0114 | | | | | .31 | .77 | .47 | .86 |
| 13 | 8CaO·6CuO·CrO₃·3SO₃·11H₂O | 11.4 | .0040 | | | | | 2.82 | 4.07 | 4.89 | 7.74 |
| 14 | 26CaO·7CuO·2CrO₃·5SO₃·19H₂O | 12.5 | .0022 | | | | | .08 | .08 | | |
| 15 | 6CaO·9CuO·2CrO₃·4SO₃·13H₂O | 7.8 | .003 | 1.6 | 2.5 | 2.8 | 5.5 | .29 | .8 | .33 | .9 |
| 16 | 10CaO·3CuO·CrO₃·3SO₃·21H₂O | 11.8 | .0025 | .82 | 1.2 | .27 | .5 | 1.6 | 2.6 | 1.6 | 2.6 |
| 17 | 13CaO·3CuO·CrO₃·2SO₃·22H₂O | 11.3 | .003 | | | | | | | | |
| 18 | 11MgO·4CuO·CrO₃·17H₂O | 8.3 | .005 | | | | | | | | |
| 19 | K₂O·3CuO·3CrO₃·2H₂O | 6.0 | .017 | 1.35 | 1.6 | .74 | .9 | .58 | .8 | 1.62 | 3.0 |
| 20 | K₂O·4CuO·3CrO₃·3H₂O | 6.0 | .029 | .63 | 1.6 | .23 | .3 | .13 | .4 | .55 | 1.0 |
| 21 | K₂O·5CuO·3CrO₃·2H₂O | 6.0 | .007 | 1.78 | 2.0 | .74 | .9 | .42 | .4 | 1.20 | 3.7 |
| 22 | 2K₂O·8CuO·5CrO₃·3H₂O | 6.1 | .011 | .62 | .8 | .17 | .5 | .17 | .3 | 1.51 | 2.2 |
| 23 | NH₃·3CuO·3CrO₃·4H₂O | 6.0 | .019 | | | | | | | | |
| 24 | 4CuO·2ZnO·2CrO₃·6H₂O | 6.7 | .002 | 1.91 | 3.05 | 1.12 | 1.57 | .77 | 1.22 | 1.89 | 2.72 |
| 25 | 8CuO·ZnO·3CrO₃·7H₂O | 6.9 | .0005 | | | .98 | 2.09 | 2.62 | 4.57 | 1.69 | 5.30 |
| 26 | CuO·7ZnO·2CrO₃·7H₂O | 6.2 | .0066 | 3.82 | 7.12 | .68 | 1.70 | .61 | 1.90 | 3.24 | 7.88 |
| 27 | CuO·4ZnO·CrO₃·4H₂O | 6.5 | .0004 | .64 | 1.95 | .11 | | .11 | .15 | .60 | .90 |
| 28 | 3CuO·10ZnO·3CrO₃·8H₂O | 7.5 | .0005 | 5.90 | 8.42 | 2.71 | 4.00 | 7.04 | 8.82 | 3.30 | 6.83 |
| 29 | 2CuO·2ZnO·CrO₃·5H₂O | 6.9 | .0024 | | | | | | | | |
| 30 | 2ZnO·CuO·CrO₃·3H₂O | 7.0 | .0045 | | | | | | | | |
| 31 | 9CaO·ZnO·3CuO·CrO₃·3SO₃·18H₂O | 11.6 | .0075 | 1.7 | | 3.4 | | | | | |
| 32 | 8CaO·3ZnO·3CuO·CrO₃·5SO₃·22H₂O | 8.0 | .011 | 5.7 | | 8.2 | | | | | |
| 33 | 29CaO·5ZnO·5CuO·2CrO₃·7SO₃·57H₂O | 11.9 | .0015 | 1.8 | | 2.1 | | 2.4 | | 1.9 | |
| 34 | 4CuO·2CdO·2CrO₃·5H₂O | 6.9 | .0003 | .48 | .82 | .19 | .27 | .08 | .20 | .60 | .88 |
| 35 | K₂O·7CuO·3CdO·3CrO₃·8H₂O | 7.5 | .005 | .15 | .24 | .07 | .19 | .09 | .20 | .11 | .11 |
| 36 | 2CuO·CdO·CrO₃·5H₂O | 7.4 | .0029 | | | | | | | | |
| 37 | 4CuO·CdO·2CrO₃·5H₂O | 6.5 | .00016 | .4 | | .8 | | | | | |
| 38 | 8CuO·CdO·3CrO₃·9H₂O | 6.7 | .0009 | .8 | | .7 | | | | | |
| 39 | 6CuO·2CdO·ZnO·3CrO₃·9H₂O | 6.6 | .00314 | .3 | | 1.0 | | | | | |
| 40 | CuO·CdO·3ZnO·CrO₃·4H₂O | 6.8 | .0031 | | | | | | | | |
| 41 | 8CuO·3UO₃·2CrO₃·8H₂O | 7.4 | .0056 | .12 | 1.03 | .11 | 2.26 | .06 | .36 | .40 | .67 |
| 42 | K₂O·3CuO·3UO₃·3CrO₃·5H₂O | 5.5 | .014 | 1.67 | 2.57 | 1.17 | 2.26 | .22 | .34 | 1.46 | 2.48 |
| 43 | 3CuO·Cr₂O₃·CrO₃·6H₂O | 6.6 | .0014 | .50 | .50 | .88 | 1.29 | 1.21 | 3.20 | 3.20 | 5.10 |
| 44 | K₂O·6CuO·2Al₂O₃·4CrO₃·15H₂O | 5.5 | .008 | .65 | 1.33 | .11 | .11 | .11 | .11 | 1.24 | 2.32 |
| 45 | K₂O·14CuO·5Al₂O₃·5CrO₃·38H₂O | 6.8 | .0048 | 1.20 | 2.31 | .25 | .42 | .09 | .21 | .79 | 1.40 |
| 46 | 3CuO·Al₂O₃·CrO₃·20H₂O | 7.2 | .0024 | | | | | .24 | .44 | 2.81 | 4.14 |
| 47 | 8Al₂O₃·4CuO·CrO₃·4SO₃·40H₂O | 5.6 | .005 | | | | | | | | |
| 48 | 2CuO·PbO·2CrO₃·3H₂O | 6.8 | .0155 | .30 | .48 | .30 | .48 | .62 | .97 | 1.46 | 2.05 |
| 49 | 3CuO·3BaO·4CrO₃·6H₂O | 6.0 | .0016 | .87 | 1.08 | .15 | .15 | 2.39 | 3.77 | 1.04 | 1.47 |
| 50 | 2BaO·CuO·2CrO₃·2H₂O | 6.5 | .0003 | .06 | | .09 | | .09 | | .09 | |
| 51 | 5BaO·5CuO·6CrO₃·9H₂O | 6.4 | .0007 | .26 | | .09 | | .15 | | .24 | |
| 52 | BaO·2CuO·2CrO₃·3H₂O | 6.5 | .001 | 1.6 | | .42 | | .21 | | .62 | |
| 53 | 5BaO·3CuO·6CrO₃·6H₂O | 6.5 | .0005 | .27 | | .07 | | .09 | | .09 | |
| 54 | BaO·3CuO·2CrO₃·3H₂O | 6.4 | .001 | 1.3 | | 1.9 | | .71 | | .53 | |
| 55 | 3BaO·CuO·4CrO₃·4H₂O | 6.3 | .010 | .31 | | .41 | | .57 | | 1.1 | |
| 56 | 16CuO·Ag₂O·8CrO₃·13H₂O | 5.2 | .02 | 7.02 | 8.80 | 1.74 | 3.44 | 7.96 | 10.7 | 7:02 | 8.81 |
| 57 | 5CuO·HgO·3CrO₃·7H₂O | 5.5 | .02 | 2.97 | 4.16 | 2.88 | 4.07 | 3.95 | 8.04 | 4.31 | 6.18 |
| 58 | 2CuO·CoO·CrO₃·4H₂O | 7.5 | .0023 | .6 | | 1.1 | | | | | |
| 59 | 20CuO·2CoO·7CrO₃·21H₂O | 7.3 | .0008 | 1.1 | | .8 | | | | | |
| 60 | 4CuO·CoO·ZnO·2CrO₃·5H₂O | 7.2 | .0042 | 1.3 | | .8 | | | | | |
| 61 | 7CuO·CoO·2ZnO·3CrO₃·11H₂O | 7.1 | .0008 | .7 | | 1.0 | | | | | |
| 62 | 2CuO·NiO·CrO₃·3H₂O | 7.1 | .0026 | 9.8 | | 6.1 | | | | | |
| 63 | 3CuO·2NiO·CrO₃·4H₂O | 7.9 | .0013 | 11.0 | | 9.6 | | | | | |
| 64 | 8CuO·NiO·2CrO₃·10H₂O | 7.5 | .00065 | | | | | | | | |
| 65 | 4CuO·NiO·ZnO·2CrO₃·6H₂O | 7.1 | .0051 | 7.1 | | 2.4 | | | | | |
| 66 | 3CuO·NiO·ZnO·CrO₃·4H₂O | 7.6 | .0017 | 9.8 | | 4.6 | | | | | |
| 67 | 6CuO·NiO·2ZnO·2CrO₃·10H₂O | 7.2 | .00081 | | | | | | | | |
| 68 | 9CuO·3Ce₂O₃·2CrO₃·19H₂O | 8.0 | .0029 | 4.26 | 6.00 | 4.47 | 11.4 | 8.60 | 12.2 | 10.2 | 15.6 |
| 69 | K₂O·17CuO·3Ce₂O₃·11CrO₃·23H₂O | 6.6 | .011 | 1.75 | 2.19 | .69 | 1.01 | 4.26 | 6.00 | 3.24 | 4.27 |
| 70 | CaO·10CuO·3As₂O₅·2CrO₃·9H₂O | 5.3 | .011 | .72 | 1.0 | .54 | .7 | .39 | .5 | 2.10 | 2.5 |
| 71 | 2Na₂O·16CuO·4As₂O₅·3CrO₃·15H₂O | 5.0 | .021 | 3.19 | 4.37 | 2.73 | 4.04 | 10.3 | 15.7 | 4.81 | 7.49 |
| 72 | 11CuO·4Fe₂O₃·5CrO₃·14H₂O | 5.1 | .0049 | 1.62 | 2.0 | 1.35 | 1.5 | 1.51 | 1.8 | 1.95 | 2.5 |
| 73 | 6CuO·2Fe₂O₃·4CrO₃·9H₂O | 5.2 | .016 | 1.41 | 1.9 | .76 | 1.0 | .55 | .9 | 1.35 | 1.8 |
| 74 | 9CuO·3Fe₂O₃·CrO₃·12H₂O | 7.3 | .00036 | 2.75 | 3.5 | 2.34 | 3.4 | .34 | .5 | 3.02 | 6.0 |
| 75 | 3Fe₂O₃·CuO·CrO₃·5H₂O | 5.9 | .008 | | | | | | | | |
| 76 | 6CuO·2Fe₂O₃·2CrO₃·7H₂O | 7.0 | .0123 | 2.50 | 6.60 | .11 | .11 | .28 | .55 | .24 | .41 |
| 77 | 4(EDA)·8CuO·4CrO₃·SO₃·12H₂O (EDA=ethylene diamine.) | 5.6 | .0074 | .52 | 1.04 | .12 | .23 | .11 | .11 | .21 | .51 |
| 78 | 25CuO·(p-nitrophenate)·4CrO₃·XH₂O | 7.3 | .0005 | 4.35 | | 1.73 | | | | | |
| 79 | 6CuO·(p-nitrobenzoate)·CrO₃·XH₂O | 5.5 | .0045 | 4.35 | | 1.3 | | | | | |
| 80 | 4(organic)·2CuO·5CrO₃·7H₂O (organic=2heptadecyl-2-imidazoline.) | 6.0 | .0016 | .24 | | .83 | | | | | |
| 81 | 5ZnO·CrO₃·4H₂O | 7.1 | .00045 | 1.18 | | .84 | | .27 | | 3.9 | |
| 82 | 4ZnO·CrO₃·4H₂O | 6.6 | .0013 | | | | | .09 | .16 | 1.47 | 2.06 |
| 83 | 6ZnO·CrO₃·4H₂O | 6.8 | .0005 | 2.95 | 4.11 | 1.94 | 2.59 | 7.03 | 8.85 | 10.2 | 15.7 |
| 84 | 11ZnO·2CrO₃·11H₂O | 6.5 | .0012 | .07 | | .08 | | | | | |
| 85 | 8ZnO·CrO₃·7H₂O | 7.6 | .0014 | .8 | | .6 | | | | | |
| 86 | 7ZnO·CrO₃·SO₃·7H₂O | 7.4 | .0002 | .8 | | .7 | | | | | |
| 87 | 4ZnO·CdO·CrO₃·4H₂O | 6.6 | .00045 | 2.14 | 3.37 | 1.11 | 2.31 | .24 | .96 | 1.96 | 2.72 |

TABLE A—Continued

| No. | Formula | Suspension pH | Chromate Solubility 1% Susp. | Slide Germination Tests | | | | | | | |
|---|---|---|---|---|---|---|---|---|---|---|---|
| | | | | S. f. | | A. s. | | G. c. | | M. s. | |
| | | | | LD-50 | LD-95 | LD-50 | LD-95 | LD-50 | LD-95 | LD-50 | LD-95 |
| 88 | $4ZnO \cdot Ce_2O_3 \cdot 3CrO_3 \cdot 7H_2O$ | 6.4 | .012 | 3.17 | 4.20 | .88 | 1.72 | 3.43 | 5.68 | 1.80 | 2.83 |
| 89 | $8ZnO \cdot 2Ce_2O_3 \cdot 5CrO_3 \cdot 15H_2O$ | 6.5 | .0056 | .43 | .54 | .30 | .45 | 4.80 | 7.82 | 3.64 | 6.84 |
| 90 | $12ZnO \cdot 3As_2O_5 \cdot CrO_3 \cdot 7H_2O$ | 5.1 | .025 | 1.37 | 2.01 | 5.36 | 8.00 | 7.90 | 10.7 | 9.93 | 15.3 |
| 91 | $13ZnO \cdot As_2O_5 \cdot CrO_3 \cdot 23H_2O$ | 6.6 | .0014 | 1.25 | 1.25 | 1.25 | 1.25 | | | | |
| 92 | $2ZnO \cdot CoO \cdot CrO_3 \cdot 3H_2O$ | 7.2 | .0043 | .87 | | 2.8 | | | | | |
| 93 | $4ZnO \cdot 2NiO \cdot CrO_3 \cdot 5H_2O$ | 7.4 | .0031 | 1.26 | | 1.53 | | | | | |
| 94 | $2ZnO \cdot PbO \cdot 2CrO_3 \cdot 6H_2O$ | 6.5 | .023 | .98 | 6.00 | .32 | .48 | 6.57 | 8.62 | 3.55 | 6.94 |
| 95 | $3ZnO \cdot 3BaO \cdot 4CrO_3 \cdot 6H_2O$ | 7.0 | .0020 | .25 | .36 | .15 | .15 | 1.77 | 2.20 | 5.30 | 14.1 |
| 96 | $K_2O \cdot 20ZnO \cdot 2Ag_2O \cdot 10CrO_3 \cdot 17H_2O$ | 6.9 | .011 | 2.03 | 2.82 | 1.43 | 2.04 | 2.78 | 4.06 | 3.09 | 4.18 |
| 97 | $6ZnO \cdot HgO \cdot 2CrO_3 \cdot 13H_2O$ | 7.1 | .0017 | 1.47 | 2.07 | .73 | 1.19 | 3.55 | 4.53 | 6.53 | 13.7 |
| 98 | $K_2O \cdot ZnO \cdot Fe_2O_3 \cdot 2CrO_3 \cdot 5H_2O$ | 6.4 | .13 | 1.42 | 3.57 | .21 | .30 | .19 | .31 | 2.36 | 3.98 |
| 99 | $2K_2O \cdot ZnO \cdot 4Fe_2O_3 \cdot 5CrO_3 \cdot 15H_2O$ | 6.0 | .090 | .91 | 1.57 | .96 | 1.66 | .32 | .50 | 4.32 | 7.36 |
| 100 | $4ZnO \cdot 3Fe_2O_3 \cdot 2CrO_3 \cdot 6H_2O$ | 6.4 | .020 | 3.03 | 6.50 | .23 | .38 | .10 | .35 | 7.87 | 40.4 |
| 101 | $8ZnO \cdot Fe_2O_3 \cdot 2CrO_3 \cdot 16H_2O$ | 6.7 | .0039 | 1.91 | 2.72 | .26 | .45 | .06 | .18 | 4.92 | 10.4 |
| 102 | $8ZnO \cdot Cr_2O_3 \cdot 2CrO_3 \cdot 14H_2O$ | 6.8 | .0029 | 2.95 | 5.56 | .60 | .90 | .36 | .74 | 1.64 | 6.22 |
| 103 | $ZnO \cdot 2MnO \cdot 4MnO_2 \cdot Cr_2O_3 \cdot 2CrO_3 \cdot 10H_2O$ | 5.9 | .010 | 1.70 | 3.12 | .60 | .39 | .23 | 1.21 | 2.28 | 9.8 |
| 104 | $15ZnO \cdot (3,5\ dinitrobenzoate) \cdot 2CrO_3 \cdot SO_3 \cdot XH_2O$ | 6.5 | .0002 | 3.9 | | 2.8 | | | | | |
| 105 | $12ZnO \cdot 4\ (p\text{-nitrobenzoate}) \cdot CrO_3 \cdot SO_3 \cdot XH_2O$ | 6.9 | .0004 | 10 | | 10.2 | | | | | |
| 106 | $K_2O \cdot CdO \cdot 3Fe_2O_3 \cdot 4CrO_3 \cdot 12H_2O$ | 6.1 | .079 | .58 | .96 | .65 | 1.13 | .27 | .27 | .25 | 8.30 |
| 107 | $K_2O \cdot 4CdO \cdot 4CrO_3 \cdot 3H_2O$ | 7.1 | .026 | .13 | .26 | .16 | .39 | .27 | .27 | .60 | 1.18 |
| 108 | $5CdO \cdot CrO_3 \cdot 4H_2O$ | 6.4 | .0003 | .60 | .88 | .16 | .25 | .32 | .72 | .40 | 1.50 |
| 109 | $4CdO \cdot 3Fe_2O_3 \cdot 2CrO_3 \cdot 9H_2O$ | 7.0 | .0075 | .53 | .84 | .66 | 1.00 | .14 | .25 | .19 | .27 |
| 110 | $K_2O \cdot 3CdO \cdot 5Fe_2O_3 \cdot 2Ce_2O_3 \cdot 9CrO_3 \cdot 24H_2O$ | 7.0 | .025 | | | 3.49 | 6.43 | | | 7.02 | 8.77 |
| 111 | $3HgO \cdot CrO_3$ | 6.2 | .0003 | 1.76 | 3.41 | 2.75 | 3.96 | .22 | .27 | .15 | .15 |
| 112 | $2Al_2O_3 \cdot CrO_3 \cdot 10H_2O$ | 6.2 | .0024 | 1.89 | 5.50 | .30 | .58 | .37 | .37 | 3.33 | 3.33 |
| 113 | $3Al_2O_3 \cdot CrO_3 \cdot 2H_2O$ | 4.5 | .0044 | 1.90 | 2.70 | .71 | 1.20 | .33 | .69 | 11.2 | 24.8 |
| 114 | $9Al_2O_3 \cdot 2CrO_3 \cdot 28H_2O$ | 4.3 | .009 | .99 | 1.33 | .89 | 1.29 | .15 | .38 | 10.9 | 21.2 |
| 115 | $3Al_2O_3 \cdot CrO_3 \cdot 20H_2O$ | 4.7 | .00035 | 1.41 | 2.36 | 2.00 | 2.69 | 1.28 | 1.28 | 12.3 | 16.6 |
| 116 | $3CaO \cdot 2Al_2O_3 \cdot CrO_3 \cdot 12H_2O$ | 10.8 | .027 | 1.55 | 3.07 | .75 | 1.10 | .45 | .91 | | |
| 117 | $3K_2O \cdot Al_2O_3 \cdot 3Fe_2O_3 \cdot 7CrO_3 \cdot 14H_2O$ | 5.8 | .072 | 1.43 | 3.73 | .46 | .71 | .30 | .39 | 2.13 | 3.93 |
| 118 | $K_2O \cdot 6Al_2O_3 \cdot 3Ce_2O_3 \cdot 9CrO_3 \cdot 33H_2O$ | 6.1 | .015 | 3.53 | 4.30 | 1.08 | 2.96 | 4.43 | 6.50 | 3.52 | 4.37 |
| 119 | $Al_2O_3 \cdot 2PbO \cdot 2CrO_3 \cdot 5H_2O$ | 7.0 | .023 | | | | | | | | |
| 120 | $Al_2O_3 \cdot 2BaO \cdot 2CrO_3 \cdot 5H_2O$ | 6.5 | .0016 | 4.37 | 7.63 | .35 | .51 | 7.13 | 8.93 | 5.88 | 8.29 |
| 121 | $6Al_2O_3 \cdot HgO \cdot 3CrO_3 \cdot 32H_2O$ | 6.4 | .0014 | 1.83 | 3.52 | 2.48 | 3.90 | 2.61 | 3.94 | 2.09 | 2.88 |
| 122 | $4Al_2O_3 \cdot 2Ag_2O \cdot 5CrO_3 \cdot 8H_2O$ | 6.0 | .0058 | | | | | | | | |
| 123 | $4Al_2O_3 \cdot 12MnO \cdot 8MnO_2 \cdot Cr_2O_3 \cdot 2CrO_3 \cdot 72H_2O$ | 7.4 | Nil | 123 | 123 | 123 | 123 | 1920 | 2750 | 1280 | 6980 |
| 124 | $K_2O \cdot 7Ce_2O_3 \cdot 11CrO_3 \cdot 18H_2O$ | 5.6 | .0211 | 2.90 | 5.90 | 2.32 | 3.30 | .30 | .79 | 18.3 | 75.0 |
| 125 | $Ce_2O_3 \cdot Cr_2O_3 \cdot 2CrO_3 \cdot 3H_2O$ | 5.3 | .0064 | 3.10 | 6.42 | .52 | .85 | .48 | .71 | 4.80 | 9.6 |
| 126 | $2K_2O \cdot 2Ce_2O_3 \cdot 7CrO_3 \cdot 2H_2O$ | 6.5 | .0161 | 3.00 | 4.13 | 1.42 | 2.03 | 7.03 | 8.82 | 2.93 | 4.20 |
| 127 | $4CaO \cdot 2Fe_2O_3 \cdot CrO_3 \cdot 11H_2O$ | 11.6 | .025 | .91 | 1.70 | .33 | .66 | .18 | .27 | 1.91 | 2.80 |
| 128 | $2K_2O \cdot 10Fe_2O_3 \cdot 6CrO_3 \cdot 31H_2O$ | 5.6 | .027 | 2.02 | 5.70 | .49 | .27 | .27 | .27 | 4.82 | 17.5 |
| 129 | $4Fe_2O_3 \cdot 3As_2O_5 \cdot CrO_3 \cdot 40H_2O$ | 2.8 | .007 | 4.1 | | 3.7 | | 3.8 | | 4.0 | |
| 130 | $3CaO \cdot 2Fe_2O_3 \cdot 4CrO_3 \cdot 4H_2O$ | 7.2 | .09 | 2.3 | 3.6 | 1.7 | 3.3 | 1.5 | 4.5 | 9.0 | 20.4 |
| 131 | $K_2O \cdot 6Cr_2O_3 \cdot 20Fe_2O_3 \cdot 7CrO_3 \cdot 11SO_3 \cdot 7H_2O$ | 3.1 | .009 | | | 4.0 | 16.8 | | | | |
| 132 | $K_2O \cdot Cr_2O_3 \cdot 2Fe_2O_3 \cdot 2CrO_3 \cdot 5H_2O$ | 5.2 | .034 | 1.0 | | .8 | | .8 | | 1.4 | |
| 133 | $2K_2O \cdot 3Fe_2O_3 \cdot 12CrO_3 \cdot 10H_2O$ | 2.8 | .059 | 1.1 | | .9 | | .9 | | 1.1 | |
| 134 | $K_2O \cdot 6Fe_2O_3 \cdot 3CrO_3 \cdot 9H_2O$ | 6.0 | .045 | .8 | | 1.0 | | .8 | | 1.4 | |
| 135 | $Cr_2O_3 \cdot 8Fe_2O_3 \cdot 5CrO_3 \cdot 5H_2O$ | 7.2 | .075 | .5 | .85 | .2 | .3 | .1 | | 3.3 | |
| 136 | $11Fe_2O_3 \cdot 2CrO_3 \cdot 18H_2O$ | 6.5 | .010 | 15.6 | | 3.9 | | 4.4 | | 69.0 | |
| 137 | $K_2O \cdot 2Fe_2O_3 \cdot 5CrO_3 \cdot 5H_2O$ | 2.5 | .084 | .4 | | .4 | | .4 | | .5 | |
| 138 | $4Fe_2O_3 \cdot 3CrO_3 \cdot 7H_2O$ | 2.9 | .013 | 3.5 | | 3.6 | | 3.4 | | 3.9 | |
| 139 | $K_2O \cdot Fe_2O_3 \cdot 2CrO_3 \cdot 4H_2O$ | 5.7 | .071 | 1.1 | | .9 | | .9 | | 1.1 | |
| 140 | $2\ (PDA) \cdot 7Fe_2O_3 \cdot 6CrO_3 \cdot 29H_2O$<br>(PDA = propylene diamine) | 5.9 | .031 | 1.0 | | .8 | | .8 | | 1.0 | |
| 141 | $K_2O \cdot Fe_2O_3 \cdot 4CrO_3 \cdot 4H_2O$ | 3.0 | .071 | 1 | | .8 | | .8 | | 1.0 | |
| 142 | $3K_2O \cdot 3Fe_2O_3 \cdot MnO_2 \cdot MnO_3 \cdot 8CrO_3 \cdot 19H_2O$ | 5.9 | .066 | .6 | 1.2 | 1 | 1.3 | .3 | .3 | 12.7 | 26.8 |
| 143 | $NH_3 \cdot 2Fe_2O_3 \cdot CrO_3 \cdot 5H_2O$ | 6.2 | .081 | .8 | | .7 | | .7 | | 1.0 | |
| 144 | $(HMTA) \cdot 13Fe_2O_3 \cdot Cr_2O_3 \cdot 8CrO_3 \cdot 45H_2O$<br>HMTA = hexamethylenetetramine | 5.0 | .019 | 2.7 | | 2.6 | | 2.5 | | 3.0 | |
| 145 | $(org) \cdot 4Fe_2O_3 \cdot 3CrO_3 \cdot 18H_2O$<br>org = Tetraethylenepentamine | 6.5 | .007 | | | 2.9 | | | | | |
| 146 | $2(Phen) \cdot Cr_2O_3 \cdot CrO_3 \cdot 8H_2O$<br>Phen = phenothiazine | 4.1 | .006 | 4.1 | | 5.2 | | | | | |
| 147 | $4Cr_2O_3 \cdot 3CrO_3 \cdot 15H_2O$ | 6.2 | .0021 | | | 6.05 | 8.97 | | | | |
| 148 | $2Cr_2O_3 \cdot CrO_3 \cdot 7H_2O$ | 6.2 | .0057 | | | | | 13.5 | 31 | | |
| 149 | $6(organic) \cdot Cr_2O_3 \cdot 6CrO_3 \cdot 12H_2O$<br>organic = 2-heptadecyl-2-imidazoline | 4.0 | .0034 | 2.22 | | 1.6 | | | | | |
| 150 | $4K_2O \cdot Cr_2O_3 \cdot 6MnO_2 \cdot 3MnO_3 \cdot 8CrO_3 \cdot 9H_2O$ | 6.5 | .038 | 2 | 2 | 2.5 | 2.5 | .79 | 1.4 | 5.5 | 5.5 |
| 151 | $Na_2O \cdot 5MnO \cdot 13MnO_2 \cdot 4Cr_2O_3 \cdot 4CrO_3 \cdot 18H_2O$ | 6.7 | .029 | 1.11 | | .7 | | | | | |
| 152 | $22MnO_2 \cdot 2Cr_2O_3 \cdot CrO_3 \cdot 6H_2O$ | 3.4 | .005 | | | 3.0 | 4.9 | 2.6 | 4.6 | | |
| 153 | $5CoO \cdot 2CrO_3 \cdot 6H_2O$ | 7.0 | .010 | | | | | | | | |
| 154 | $3NiO \cdot CrO_3 \cdot 3H_2O$ | 7.6 | .0095 | .74 | | .32 | | | | | |
| 155 | $4NiO \cdot CrO_3 \cdot 4H_2O$ | 7.8 | .0072 | .81 | | .33 | | | | | |
| 156 | $PbCrO_4$ | 8.4 | .0000009 | 1750 | inf. | 890 | inf. | 1760 | inf. | 625 | inf. |
| 157 | $BaCrO_4$ | 8.2 | .00007 | | | | | | | | |
| 158 | $3K_2O \cdot 8UO_3 \cdot 6Fe_2O_3 \cdot 6CrO_3 \cdot 26H_2O$ | 6.1 | .024 | 1.90 | 3.01 | 2.52 | 3.41 | .27 | .27 | 6.21 | 8.13 |
| 159 | $K_2O \cdot UO_3 \cdot 5Fe_2O_3 \cdot 3CrO_3 \cdot 14H_2O$ | 6.0 | .052 | 2.5 | 2.5 | 2.5 | 2.5 | 2.5 | 2.5 | 6.2 | 6.2 |
| 160 | $14BeO \cdot CrO_3 \cdot 14H_2O$ | 6.3 | .0038 | .24 | | .81 | | | | | |
| 161 | $K_2O \cdot 7ThO_2 \cdot 5CrO_3 \cdot 6H_2O$ | 4.4 | .0036 | .85 | | 1.7 | | | | | |
| 162 | $2Bi_2O_3 \cdot CrO_3 \cdot H_2O$ | 6.5 | nil | >100 | | >100 | | >100 | | >100 | |
| 163 | $CaCrO_4 \cdot H_2O$ | 12 | 2.3 | .68 | | .60 | | .62 | | .70 | |
| 164 | $2CaO \cdot CrO_3 \cdot 3H_2O$ | 12 | .16 | .70 | | .65 | | .66 | | .67 | |

TABLE A—Continued

| No. | Formula | Per Cent Disease Greenhouse Tests | | | | Phytotoxicity | | Rating Insecticide Tests | | | |
|---|---|---|---|---|---|---|---|---|---|---|---|
| | | Rapid | | | Weathering Late Blight | Buckwheat Bushbean Tobacco | Tomato | Canker Worm | Colorado Potato Beetle | Japanese Beetle | Flea Beetle |
| | | Late Blight | Early Blight | Septoria Leaf Spot | | | | | | | |
| 1 | 8CuO·3CrO₃·6H₂O | 3 | 1.9 | 32 | | 0 | | | | | |
| 2 | 4CuO·CrO₃·3H₂O | | | | | | | | | | |
| 3 | 3CuO·CrO₃·3H₂O | 1.1 | 5.6 | 14 | 10 | 0 | .3 | | | | |
| 4 | 7CuO·2CrO₃·6H₂O | 2.5 | 10.0 | 1 | 8.5 | 0 | .2 | E | A | E | E |
| 5 | 6CuO·2CrO₃·5H₂O | 1.5 | 3.7 | | 10 | 0 | .7 | | | | |
| 6 | 5CuO·CrO₃·4H₂O | | 15 | | | 0 | | | | | |
| 7 | 6CuO·2CrO₃·5H₂O | | 0 | | | 0 | | | | | |
| 8 | 6CuO·CrO₃·5H₂O | | 2.7 | | | 0 | | | | | |
| 9 | 12CuO·3CrO₃·SO₃·8H₂O | | 0 | | | 0 | | | | | |
| 10 | 3CuO·CrO₃·3H₂O+some NH₃ | 9.5 | 0 | | 5 | | .5 | B | A | | |
| 11 | 5CuO·2CrO₃·5H₂O | 5.8 | 0 | | 25 | | .5 | B | C | C | |
| 12 | 5CaO·7CuO·2CrO₃·4SO₃·6H₂O | 2.8 | 18 | | 2.7 | | 1.0 | A | C | E | |
| 13 | 8CaO·6CuO·CrO₃·3SO₃·11H₂O | 5.2 | 19 | | 24 | | 0 | D | C | E | |
| 14 | 26CaO·7CuO·2CrO₃·5SO₃·19H₂O | 3.6 | 8 | | 10 | | .7 | B | | E | |
| 15 | 6CaO·9CuO·2CrO₃·4SO₃·13H₂O | | | | | | | | | | |
| 16 | 10CaO·3CuO·CrO₃·3SO₃·21H₂O | 6.4 | 3.5 | | | .3 | | | | | |
| 17 | 13CaO·3CuO·CrO₃·2SO₃·22H₂O | | 11 | | | .3 | | | | | |
| 18 | 11MgO·4CuO·CrO₃·17H₂O | 3.4 | 5.4 | | | 0 | | | | | |
| 19 | K₂O·3CuO·3CrO₃·2H₂O | 2.9 | 2.6 | 2.0 | 1.5 | 1.3 | | | | | |
| 20 | K₂O·4CuO·3CrO₃·3H₂O | 2.8 | 6.2 | 9.0 | | | | B | | E | C |
| 21 | K₂O·5CuO·3CrO₃·2H₂O | 1.6 | 9.4 | | 5.0 | .8 | .7 | | | | |
| 22 | 2K₂O·8CuO·5CrO₃·3H₂O | | | | | | | E | C | E | C |
| 23 | NH₃·3CuO·3CrO₃·4H₂O | 3.6 | 3.3 | | 3.5 | | 0 | | | | |
| 24 | 4CuO·2ZnO·2CrO₃·6H₂O | 9.0 | 10 | 8.5 | | 0 | | E | C | E | |
| 25 | 8CuO·ZnO·3CrO₃·7H₂O | 3.1 | 5.8 | | 7 | 0 | 0 | A | | A | |
| 26 | CuO·7ZnO·2CrO₃·7H₂O | 19 | 7.4 | | 16 | 1.0 | 1.0 | C | E | | |
| 27 | CuO·4ZnO·CrO₃·4H₂O | 7.6 | 5.0 | | 10 | 0 | .2 | D | A | E | C |
| 28 | 3CuO·10ZnO·3CrO₃·8H₂O | | | | 20 | | 0 | C | A | C | B |
| 29 | 2CuO·2ZnO·CrO₃·5H₂O | 6.4 | 14.0 | | 10 | .3 | 0 | | A | D | E |
| 30 | 2ZnO·CuO·CrO₃·3H₂O | 10.0 | 8.4 | | | 0 | | | | | |
| 31 | 9CaO·ZnO·3CuO·CrO₃·3SO₃·18H₂O | 2.8 | 16 | | | .3 | | | | | |
| 32 | 8CaO·3ZnO·3CuO·CrO₃·5SO₃·22H₂O | 1.4 | 12 | | | 0 | | | | | |
| 33 | 29CaO·5ZnO·5CuO·2CrO₃·7SO₃·57H₂O | 3.4 | 7.9 | | | .6 | | | | | |
| 34 | 4CuO·2CdO·2CrO₃·5H₂O | 3.9 | 11.0 | | 5 | 0 | .5 | A | A | C | B |
| 35 | K₂O·7CuO·3CdO·3CrO₃·8H₂O | 3.5 | 4.4 | | 4 | 0 | 0 | C | A | | |
| 36 | 2CuO·CdO·CrO₃·5H₂O | | | | 7.0 | | 0 | A | A | B | A |
| 37 | 4CuO·CdO·2CrO₃·5H₂O | 6.4 | | | 1.5 | .7 | | A | A | C | |
| 38 | 8CuO·CdO·3CrO₃·9H₂O | 0.8 | 3.5 | | 7.0 | .3 | .5 | B | | E | B |
| 39 | 6CuO·2CdO·ZnO·3CrO₃·9H₂O | | | | 10 | | .7 | | | | |
| 40 | CuO·CdO·3ZnO·CrO₃·4H₂O | 8.0 | | | 14 | .7 | .5 | A | B | C | |
| 41 | 8CuO·3UO₃·2CrO₃·8H₂O | 3.4 | 13 | | 19 | 0 | .2 | E | C | E | |
| 42 | K₂O·3CuO·3UO₃·3CrO₃·5H₂O | 14 | 6.5 | | 35 | 1 | 0 | | C | E | |
| 43 | 3CuO·Cr₂O₃·CrO₃·6H₂O | 4.3 | 32 | | 30 | | | E | | E | |
| 44 | K₂O·6CuO·2Al₂O₃·4CrO₃·15H₂O | 3.7 | 14.0 | | 11 | 0 | .7 | B | A | | |
| 45 | K₂O·14CuO·5Al₂O₃·5CrO₃·38H₂O | 5.0 | 13 | | 12 | 0 | | | | | |
| 46 | 3CuO·Al₂O₃·CrO₃·20H₂O | | | | | | | A | C | C | E |
| 47 | 8Al₂O₃·4CuO·CrO₃·4SO₃·40H₂O | 5.4 | 7.9 | | | .3 | | | | | |
| 48 | 2CuO·PbO·2CrO₃·3H₂O | | 3.2 | | 12 | | .8 | B | D | E | |
| 49 | 3CuO·3BaO·4CrO₃·6H₂O | 9.0 | 13.0 | | 11 | | 0 | E | C | E | |
| 50 | 2BaO·CuO·2CrO₃·2H₂O | | | | | 0 | | | | | |
| 51 | 5BaO·5CuO·6CrO₃·9H₂O | | | | | .6 | | | | | |
| 52 | BaO·2CuO·2CrO₃·3H₂O | | | | | 0 | | | | | |
| 53 | 5BaO·3CuO·6CrO₃·6H₂O | | | | | | | | | | |
| 54 | BaO·3CuO·2CrO₃·3H₂O | | | | | | | | | | |
| 55 | 3BaO·CuO·4CrO₃·4H₂O | | | | | 1.3 | | | | | |
| 56 | 16CuO·Ag₂O·8CrO₃·13H₂O | 0 | 13.0 | | 2.2 | | .3 | D | B | E | C |
| 57 | 5CuO·HgO·3CrO₃·7H₂O | 0 | 25.0 | | 5 | | 0 | A | A | B | A |
| 58 | 2CuO·CoO·CrO₃·4H₂O | | | | 11 | | 0 | A | A | C | B |
| 59 | 20CuO·2CoO·7CrO₃·21H₂O | | | | 3.2 | | .5 | | | | E |
| 60 | 4CuO·CoO·ZnO·2CrO₃·5H₂O | | | | 5.5 | | .5 | A | A | | E |
| 61 | 7CuO·CoO·2ZnO·3CrO₃·11H₂O | | | | 4.5 | | .5 | A | D | B | E |
| 62 | 2CuO·NiO·CrO₃·3H₂O | | | | 2 | | 0 | | | | |
| 63 | 3CuO·2NiO·CrO₃·4H₂O | | | | 9.5 | | 0 | E | A | D | |
| 64 | 8CuO·NiO·2CrO₃·10H₂O | | | | 4 | | 0 | E | A | A | |
| 65 | 4CuO·NiO·ZnO·2CrO₃·6H₂O | | | | 3.9 | | 0 | C | D | D | B |
| 66 | 3CuO·NiO·CrO₃·4H₂O | | | | 6.6 | | 0 | B | A | | E |
| 67 | 6CuO·NiO·2ZnO·2CrO₃·10H₂O | | | | 20 | | | A | C | D | E |
| 68 | 9CuO·3Ce₂O₃·2CrO₃·19H₂O | 4.6 | 3.0 | | 8 | 0 | 0 | E | A | E | D |
| 69 | K₂O·17CuO·3Ce₂O₃·11CrO₃·23H₂O | | | | 19 | | .7 | D | B | E | |
| 70 | CaO·10CuO·3As₂O₃·2CrO₃·9H₂O | 9 | 7 | | 5.1 | .5 | 0 | B | A | B | |
| 71 | 2Na₂O·16CuO·4As₂O₃·3CrO₃·15H₂O | | | | 16 | | 0 | B | A | D | D |
| 72 | 11CuO·4Fe₂O₃·5CrO₃·14H₂O | 1.4 | 6.6 | 7.0 | | | 0 | B | B | E | |
| 73 | 6CuO·2Fe₂O₃·4CrO₃·9H₂O | 4.1 | 3.5 | 24 | 9.5 | 1.0 | 0 | A | E | | C |
| 74 | 9CuO·3Fe₂O₃·CrO₃·12H₂O | 4.8 | 10.3 | | 9 | 0 | 0 | A | | C | E |
| 75 | 3Fe₂O₃·CuO·CrO₃·5H₂O | 2.4 | 6.2 | | | .3 | | | | | |
| 76 | 6CuO·2Fe₂O₃·2CrO₃·7H₂O | 13 | 5.6 | | | | | C | B | | |
| 77 | 4(EDA)·8CuO·4CrO₃·SO₃·12H₂O (EDA=ethylene diamine.) | 1.2 | 6.0 | | | 1.0 | | D | | | |
| 78 | 25CuO·(p-nitrophenate)·4CrO₃·XH₂O | 6.4 | | | | 0 | | | | | |
| 79 | 6CuO·(p-nitrobenzoate)·CrO₃·XH₂O | 8.0 | | | | 0 | | | | | |
| 80 | 4(organic)·2CuO·5CrO₃·7H₂O (organic=2-heptadecyl-2-imidazoline.) | | | | | | | | | | |
| 81 | 5ZnO·CrO₃·4H₂O | 4.8 | 2.7 | 12 | | 0 | 0 | B | | E | |
| 82 | 4ZnO·CrO₃·4H₂O | 17 | 10 | | | | 0 | C | A | C | E |
| 83 | 6ZnO·CrO₃·4H₂O | 11 | 3.5 | | | | 0 | A | A | | E |
| 84 | 11ZnO·2CrO₃·11H₂O | | | | | .6 | 0 | C | A | E | E |
| 85 | 8ZnO·CrO₃·7H₂O | | | | | .6 | 0 | B | A | D | E |
| 86 | 7ZnO·CrO₃·SO₃·7H₂O | | | | | | | E | | E | |

TABLE A—Continued

| No. | Formula | Per Cent Disease Greenhouse Tests | | | | Phytotoxicity | | Rating Insecticide Tests | | | |
|---|---|---|---|---|---|---|---|---|---|---|---|
| | | Rapid | | | Weathering Late Blight | Buckwheat Bushbean Tobacco | Tomato | Canker Worm | Colorado Potato Beetle | Japanese Beetle | Flea Beetle |
| | | Late Blight | Early Blight | Septoria Leaf Spot | | | | | | | |
| 87 | 4ZnO·CdO·CrO$_3$·4H$_2$O | 5.0 | 14 | | | 0 | | B | A | E | D |
| 88 | 4ZnO·Ce$_2$O$_3$·3CrO$_3$·7H$_2$O | | | | 11 | | 0 | | | | |
| 89 | 8ZnO·2Ce$_2$O$_3$·5CrO$_3$·15H$_2$O | | 3 | | 15 | | 0 | C | E | E | E |
| 90 | 12ZnO·3As$_2$O$_5$·CrO$_3$·7H$_2$O | 30 | 7 | | 9 | | | B | A | E | C |
| 91 | 13ZnO·As$_2$O$_5$·CrO$_3$·23H$_2$O | | | | 14 | 0 | | | | | D |
| 92 | 2ZnO·CoO·CrO$_3$·3H$_2$O | | | | | .3 | | D | C | E | |
| 93 | 4ZnO·2NiO·CrO$_3$·5H$_2$O | | | | | | 0 | C | A | E | E |
| 94 | 2ZnO·PbO·2CrO$_3$·6H$_2$O | 18 | 12 | | 17 | 0 | 0 | D | | E | |
| 95 | 3ZnO·3BaO·4CrO$_3$·6H$_2$O | | 13 | | 11 | 0 | 0 | E | E | | |
| 96 | K$_2$O·20ZnO·2Ag$_2$O·10CrO$_3$·17H$_2$O | | 5 | | 8 | 0 | 0 | C | B | D | |
| 97 | 6ZnO·HgO·2Cl$_2$O·13H$_2$O | 15 | 15 | | 7 | | 0 | B | A | B | E |
| 98 | K$_2$O·ZnO·Fe$_2$O$_3$·2CrO$_3$·5H$_2$O | | 25 | 17 | 16 | 2.5 | 3 | B | C | E | |
| 99 | 2K$_2$O·ZnO·4Fe$_2$O$_3$·5CrO$_3$·15H$_2$O | 5.1 | 22 | | | 2.3 | 3 | | | | |
| 100 | 4ZnO·3Fe$_2$O$_3$·2CrO$_3$·6H$_2$O | 6.6 | 6.5 | | | 0 | 0 | C | E | C | |
| 101 | 8ZnO·Fe$_2$O$_3$·2CrO$_3$·16H$_2$O | 11 | 22 | | | 0 | 1 | B | B | E | C |
| 102 | 8ZnO·Cr$_2$O$_3$·2CrO$_3$·14H$_2$O | 6.3 | 8.2 | | | 0 | 0 | D | | E | |
| 103 | ZnO·2MnO·4MnO$_2$·Cr$_2$O$_3$·2CrO$_3$·10H$_2$O | 40 | | 17 | | 1 | | | | | |
| 104 | 15ZnO·(3,5 dinitrobenzoate)·2CrO$_3$·SO$_3$·XH$_2$O | 4.2 | | | | | 0 | | | | |
| 105 | 12ZnO·4(p-nitrobenzoate)·CrO$_3$·SO$_3$·XH$_2$O | 19 | | | | | 0 | | | | |
| 106 | K$_2$O·CdO·3Fe$_2$O$_3$·4CrO$_3$·12H$_2$O | 1.5 | 8.2 | 3.4 | 28 | 2.7 | 2 | B | A | E | |
| 107 | K$_2$O·4CdO·4CrO$_3$·3H$_2$O | 2.4 | 4.2 | 2.5 | 9 | | 0 | A | A | E | |
| 108 | 5CdO·CrO$_3$·4H$_2$O | 5.7 | | | | 0 | 0 | E | A | E | |
| 109 | 4CdO·3Fe$_2$O$_3$·2CrO$_3$·9H$_2$O | 8.0 | | | | 1 | | C | B | E | |
| 110 | K$_2$O·3CdO·5Fe$_2$O$_3$·2Ce$_2$O$_3$·9CrO$_3$·24H$_2$O | 15.0 | 19.0 | | 11 | | 0 | E | E | E | |
| 111 | 3HgO·CrO$_3$ | | 26 | | | | | A | A | E | |
| 112 | 2Al$_2$O$_3$·CrO$_3$·10H$_2$O | 19 | 10 | 13 | 16 | .9 | 0 | B | D | E | |
| 113 | 3Al$_2$O$_3$·CrO$_3$·2H$_2$O | 20 | 8 | | | .9 | | | | | |
| 114 | 9Al$_2$O$_3$·2CrO$_3$·29H$_2$O | 15 | 9.8 | 19 | | 1.3 | 1.0 | B | E | E | |
| 115 | 3Al$_2$O$_3$·CrO$_3$·20H$_2$O | 29 | 6 | 21 | | .9 | | C | E | E | E |
| 116 | 3CaO·2Al$_2$O$_3$·CrO$_3$·12H$_2$O | | 5.5 | | | 0 | | | | | |
| 117 | 3K$_2$O·Al$_2$O$_3$·3Fe$_2$O$_3$·7CrO$_3$·14H$_2$O | | | | 25 | 3 | 3 | | | | |
| 118 | K$_2$O·6Al$_2$O$_3$·3Ce$_2$O$_3$·9CrO$_3$·33H$_2$O | 27 | 25 | | 15 | | 0 | | | | |
| 119 | Al$_2$O$_3$·2PbO·2CrO$_3$·5H$_2$O | 20 | 13 | | 16 | | 0 | | | | |
| 120 | Al$_2$O$_3$·2BaO·2CrO$_3$·5H$_2$O | 11 | 17 | | | | 0 | | | | |
| 121 | 6Al$_2$O$_3$·HgO·3CrO$_3$·32H$_2$O | 4.5 | 19 | | 11 | | 0 | | | | |
| 122 | 4Al$_2$O$_3$·2Ag$_2$O·5CrO$_3$·8H$_2$O | 0 | | | 17 | | 0 | | | | |
| 123 | 4Al$_2$O$_3$·12MnO·8MnO$_2$·Cr$_2$O$_3$·2CrO$_3$·72H$_2$O | | | 85 | | | | | | | |
| 124 | K$_2$O·7Ce$_2$O$_3$·11CrO$_3$·18H$_2$O | | 5.4 | 28 | | .6 | 0 | | | | |
| 125 | Ce$_2$O$_3$·Cr$_2$O$_3$·2CrO$_3$·3H$_2$O | 30 | 3.9 | | | 0 | | C | C | E | |
| 126 | 2K$_2$O·2Ce$_2$O$_3$·7CrO$_3$·2H$_2$O | 40 | 22 | | 15 | | 0 | C | B | | |
| 127 | 4CaO·2Fe$_2$O$_3$·CrO$_3$·11H$_2$O | 16 | 27 | | | 1.0 | | | | | |
| 128 | 2K$_2$O·10Fe$_2$O$_3$·6CrO$_3$·31H$_2$O | | 22 | 0 | 41 | 1.8 | | A | | E | |
| 129 | 4Fe$_2$O$_3$·3As$_2$O$_5$·CrO$_3$·40H$_2$O | 11 | 20 | | 44 | | 0 | B | E | | |
| 130 | 3CaO·2Fe$_2$O$_3$·4CrO$_3$·4H$_2$O | 12 | | | | 2.3 | | | | | |
| 131 | K$_2$O·6Cr$_2$O$_3$·20Fe$_2$O$_3$·7CrO$_3$·11SO$_3$·7H$_2$O | | | | | 1.0 | | | | | |
| 132 | K$_2$O·Cr$_2$O$_3$·2Fe$_2$O$_3$·2CrO$_3$·5H$_2$O | | 11 | | | | | | | | |
| 133 | 2K$_2$O·3Fe$_2$O$_3$·12CrO$_3$·10H$_2$O | 6.9 | 9.2 | 0 | | | | | | | |
| 134 | K$_2$O·6Fe$_2$O$_3$·3CrO$_3$·9H$_2$O | 26 | 17 | | | 2.3 | | | | | |
| 135 | Cr$_2$O$_3$·8Fe$_2$O$_3$·5CrO$_3$·5H$_2$O | | 15 | 9 | | 2.3 | | | | | |
| 136 | 11Fe$_2$O$_3$·2CrO$_3$·18H$_2$O | | | | | 0 | | | | | |
| 137 | K$_2$O·2Fe$_2$O$_3$·5CrO$_3$·5H$_2$O | 7.7 | | | | 2.3 | | | | | |
| 138 | 4Fe$_2$O$_3$·3CrO$_3$·7H$_2$O | 26 | 13 | | | 0 | | | | | |
| 139 | K$_2$O·Fe$_2$O$_3$·2CrO$_3$·4H$_2$O | | | | 22 | 3.0 | | | | | |
| 140 | 2(PDA)·7Fe$_2$O$_3$·6CrO$_3$·29H$_2$O (PDA=propylene diamine) | | 5.7 | | | 2.7 | | | | | |
| 141 | K$_2$O·Fe$_2$O$_3$·4CrO$_3$·4H$_2$O | 5.8 | 5.2 | 9 | | 2.3 | | | | | |
| 142 | 3K$_2$O·3Fe$_2$O$_3$·MnO·MnO$_2$·8CrO$_3$·19H$_2$O | 16 | 6.8 | 10 | | 2.3 | | | | | |
| 143 | NH$_3$·2Fe$_2$O$_3$·CrO$_3$·5H$_2$O | | | | | 2.5 | | | | | |
| 144 | (HMTA)·13Fe$_2$O$_3$·Cr$_2$O$_3$·8CrO$_3$·45H$_2$O HMTA=hexamethylenetetramine | 27 | 2.9 | | | 1.3 | 0 | D | E | E | |
| 145 | (org)·4Fe$_2$O$_3$·3CrO$_3$·18H$_2$O org=Tetraethylenepentamine | | | | | .3 | | | | | |
| 146 | 2(Phen)·Cr$_2$O$_3$·CrO$_3$·8H$_2$O Phen=phenothiazine | | 17.0 | | | 0 | 0 | E | B | E | D |
| 147 | 4Cr$_2$O$_3$·3CrO$_3$·15H$_2$O | | 12 | | | | .5 | | | | |
| 148 | 2Cr$_2$O$_3$·CrO$_3$·7H$_2$O | | 26 | | | 0 | | | | | |
| 149 | 6(organic)·Cr$_2$O$_3$·6CrO$_3$·12H$_2$O organic=2=heptadecyl-2-imidazoline | | | | | .5 | | | | | |
| 150 | 4K$_2$O·Cr$_2$O$_3$·6MnO·3MnO$_2$·8CrO$_3$·9H$_2$O | 2.2 | 6.7 | | | 2.5 | | | | | |
| 151 | Na$_2$O·5MnO·13MnO$_2$·4Cr$_2$O$_3$·4CrO$_3$·18H$_2$O | | | | | | | | | | |
| 152 | 22MnO$_2$·2Cr$_2$O$_3$·CrO$_3$·6H$_2$O | | | | | | | | | | |
| 153 | 5CoO·2CrO$_3$·6H$_2$O | | | | | 1 | 1 | A | A | C | B |
| 154 | 3NiO·CrO$_3$·3H$_2$O | | | | | 1 | | | | | E |
| 155 | 4NiO·CrO$_3$·4H$_2$O | | | | | 1 | 0 | E | B | E | E |
| 156 | PbCrO$_4$ | 100 | | | | | | | | | |
| 157 | BaCrO$_4$ | 67 | 96 | | | | | | | | |
| 158 | 3K$_2$O·8UO$_3$·6Fe$_2$O$_3$·6CrO$_3$·26H$_2$O | 11 | 3.3 | 10 | | 1 | | | | | |
| 159 | K$_2$O·UO$_3$·5Fe$_2$O$_3$·3CrO$_3$·14H$_2$O | 11 | 4.1 | 10 | | 2.3 | | | | | |
| 160 | 14BeO·CrO$_3$·14H$_2$O | 6.1 | 12 | | | 0 | | | | | |
| 161 | K$_2$O·7ThO$_2$·5CrO$_3$·6H$_2$O | | 9.8 | | | | | | | | |
| 162 | 2Bi$_2$O$_3$·CrO$_3$·H$_2$O | | | | | | | | | | |
| 163 | CaCrO$_4$·H$_2$O | | | | | 3 | | | | | |
| 164 | 2CaO·CrO$_3$·3H$_2$O | | | | | 2.7 | | | | | |

We claim:
1. A fungitoxic mass comprising a basic chromate comprising a plurality of divalent metals, one of said metals being copper, the chromate containing more than 3% by weight of hexavalent chromium and having the characteristic that when 1 part by weight is thoroughly mixed with 100 parts by weight of water until the water is saturated with the chromate at 25° C., a slurry is formed containing undissolved and dissolved chromate, the amount of chromate dissolved being such that 100 cc. of the solution contains between 0.0001 and 0.03 grams of hexavalent chromium, the undissolved chromate being capable of supplying more dissolved chromate upon mixing with more water.

2. A fungitoxic mass comprising a basic chromate comprising a plurality of multivalent metals, the chromate containing more than 3% by weight of hexavalent chromium and having the characteristic that when 1 part by weight is thoroughly mixed with 100 parts by weight of water until the water is saturated with the chromate at 25° C., a slurry is formed containing undissolved and dissolved chromate, the amount of chromate dissolved being such that 100 cc. of the solution contains between 0.0001 and 0.03 grams of hexavalent chromium, the undissolved chromate being capable of supplying more dissolved chromate upon mixing with more water.

3. A fungitoxic mass comprising a basic chromate comprising a plurality of multivalent metals, one of said metals being divalent and another of said metals being trivalent, the chromate containing more than 3% by weight of hexavalent chromium and having the characteristic that when 1 part by weight is thoroughly mixed with 100 parts by weight of water until the water is saturated with the chromate at 25° C., a slurry is formed containing undissolved and dissolved chromate, the amount of chromate dissolved being such that 100 cc. of the solution contains between 0.0001 and 0.03 grams of hexavalent chromium, the undissolved chromate being capable of supplying more dissolved chromate upon mixing with more water.

4. A fungitoxic mass as claimed in claim 2, wherein two of said multivalent metals are copper and zinc.

5. A fungitoxic mass as claimed in claim 2, wherein two of said multivalent metals are copper and cadmium.

6. A fungitoxic mass as claimed in claim 2, wherein two of said multivalent metals are copper and calcium.

7. A fungitoxic mass as claimed in claim 2, wherein two of said multivalent metals are copper and mercury.

8. A fungitoxic mass as claimed in claim 2, wherein one of said multivalent metals is zinc.

9. A fungitoxic mass as claimed in claim 2, wherein two of said multivalent metals are zinc and cadmium.

10. A fungitoxic mass as claimed in claim 2, wherein two of said multivalent metals are zinc and mercury.

11. A fungitoxic mass as claimed in claim 2, wherein one of said metals is cadmium.

12. A fungitoxic mass as claimed in claim 2, wherein one of said metals is calcium.

13. A fungitoxic mass as claimed in claim 2, wherein one of said metals is mercury.

14. A method of combatting fungi which comprises applying to the host plant a fungitoxic mass containing, as an active ingredient, a basic chromate comprising a plurality of multivalent metals, the chromate containing more than 3% by weight of hexavalent chromium and having the characteristic that when 1 part by weight is thoroughly mixed with 100 parts by weight of water until the water is saturated with the chromate at 25° C., a slurry is formed containing undissolved and dissolved chromate, the amount of chromate dissolved being such that 100 cc. of the solution contains between 0.0001 and 0.03 gram of hexavalent chromium, the undissolved chromate being capable of supplying more dissolved chromate upon mixing with more water.

15. A method as claimed in claim 14 wherein one of said multivalent metals is divalent and another of said multivalent metals is trivalent.

16. A method as claimed in claim 14 wherein one of said multivalent metals is copper.

17. A method as claimed in claim 14 wherein two of said multivalent metals are copper and zinc.

18. A method as claimed in claim 14 wherein two of said multivalent metals are copper and cadmium.

19. A method as claimed in claim 14 wherein two of said multivalent metals are copper and calcium.

20. A method as claimed in claim 14 wherein two of said multivalent metals are copper and mercury.

21. A method as claimed in claim 14 wherein one of said multivalent metals is zinc.

22. A method as claimed in claim 14 wherein two of said multivalent metals are zinc and cadmium.

23. A method as claimed in claim 14 wherein two of said multivalent metals are zinc and mercury.

24. A method as claimed in claim 14 wherein one of said metals is cadmium.

25. A method as claimed in claim 14 wherein one of said metals is calcium.

26. A method as claimed in claim 14 wherein one of said metals is mercury.

CARLETON N. SMITH.
FRED R. WHALEY.
RICHARD H. WELLMAN.

REFERENCES CITED

The following references are of record in the file of this patent:

UNITED STATES PATENTS

| Number | Name | Date |
|---|---|---|
| 1,166,387 | Ramage | Dec. 28, 1915 |
| 1,390,088 | Constantin | Sept. 6, 1921 |
| 1,496,436 | Steinhart | June 3, 1924 |
| 1,766,412 | Taylor | June 24, 1930 |
| 2,019,121 | De Rewal | Oct. 29, 1935 |
| 2,106,978 | Kamesam | Feb. 1, 1938 |
| 2,213,168 | Monk et al. | Aug. 27, 1940 |
| 2,359,697 | Udy | Oct. 3, 1944 |

OTHER REFERENCES

Mellor, "Comprehensive Treatise on Inorganic and Theoretical Chemistry," vol. 11, pp. 308, 310 (1931).

Petit, Compt. rend. Acad. Agr. France, vol. 16, pp. 529-533 (1930), thru Frear, Catalogue of Insect. and Fung., vol. II, page 51 (1938).

Mellor, "Comprehensive Treatise on Inorganic and Theoretical Chemistry," vol. 11, page 304 (1931).